United States Patent [19]

Frankel et al.

[11] Patent Number: 5,355,492
[45] Date of Patent: Oct. 11, 1994

[54] SYSTEM FOR COMPILING PARALLEL COMMUNICATIONS INSTRUCTIONS INCLUDING THEIR EMBEDDED DATA TRANSFER INFORMATION

[75] Inventors: James L. Frankel, Lexington, Mass.; Michael L. Best, Frederiksberg, Denmark; Karen C. Jourdenais, Concord, Mass.; Joshua E. Simons, Cambridge, Mass.; Steven J. Sistare, Somerville, Mass.

[73] Assignee: Thinking Machines Corporation, Cambridge, Mass.

[21] Appl. No.: 788,052

[22] Filed: Nov. 5, 1991

[51] Int. Cl.⁵ .................. G06F 15/16; G06F 9/44; G06F 15/20
[52] U.S. Cl. .................. 395/700; 395/800; 395/600; 364/DIG. 1; 364/260; 364/280.4; 364/280.6; 364/230.3; 364/229.2; 364/229.4
[58] Field of Search .............. 395/200, 800, 700, 600

[56] References Cited

U.S. PATENT DOCUMENTS

| | | | |
|---|---|---|---|
| 4,598,400 | 7/1986 | Hillis | 370/60 |
| 4,773,038 | 9/1988 | Hillis et al. | 364/DIG. 2 X |
| 4,827,403 | 5/1989 | Steele, Jr. et al. | 364/DIG. 1 X |
| 4,984,235 | 1/1991 | Hillis et al. | 370/60 |
| 5,088,034 | 2/1992 | Ihara et al. | 395/700 |
| 5,136,717 | 8/1992 | Morley et al. | 395/800 |
| 5,157,785 | 10/1992 | Jackson et al. | 395/800 |
| 5,175,856 | 12/1992 | Van Dyke et al. | 395/700 |
| 5,193,202 | 3/1993 | Jackson et al. | 395/800 |
| 5,197,130 | 3/1993 | Chen et al. | 395/325 |
| 5,230,053 | 7/1993 | Zaiki | 395/700 |
| 5,237,691 | 8/1993 | Robinson et al. | 395/700 |

OTHER PUBLICATIONS

Blelloch et al., "VCODE: A Data-Parallel Intermediate Language", Third Symposium on the Frontiers of Massively Parallel Computation. Proceedings, pp. 471–480, Oct. 8–10, 1990.

John Rose et al., "C*: An Extended C* Language for Data Parallel Programming", Thinking Machines Corporation, Technical Report Series, PL87-5, Apr. 1987.

C* Reference Manual, Thinking Machines Corporation, Version 4.0A, pp. 1–34, and 61–63, Aug. 1987.

C* User's Guide, Thinking Machines Corporation, Version 4.0A, pp. 26–30, Aug. 1987.

Supplement to *C Reference Manual, Thinking Machines Corporatoin, Version 4.3, pp. 1–17, May 1988.

Paris Reference Manual, Thinking Machines Corporation, Version 6.0, pp. 1–10, 16, 19, 20, 38–41, 167, 223–228, 385–386, and 533, first printed Feb. 1989 and revised Feb. 1991.

CM Fortran Programming Guide, Thinking Machines Corporation, Version 1.0, pp. 75–77, first printed Nov. 1989, revised Feb. 1990 and revised Feb. 1991.

C* Programming Guide, Thinking Machines Corporation, Version 6.0, pp. 1–36, 108, 113–150 and 207–223, Nov. 1990.

CM Fortran Reference Manual, Thinking Machines Corporation, Version 1.0 and 1.1, pp. 276, 299–301, and 315–318, first printed Feb. 1991 and revised Jul. 1991.

*Primary Examiner*—Paul V. Kulik
*Assistant Examiner*—Wayne Amsbury
*Attorney, Agent, or Firm*—Sterne, Kessler, Goldstein & Fox

[57] ABSTRACT

The present invention is directed towards a compiler for processing parallel communication instructions on a data parallel computer. The compiler of the present invention comprises a front end, a middle end, an optimizer, and a back end. The front end constructs a parse tree which includes nodes representative of parallel communication instructions. The middle end generates an intermediate representation (IR) tree from the parse tree. The IR tree includes general parallel communication IR nodes representative of target code to carry out parallel communication with general communication. An efficient parallel communication module of the optimizer replaces general parallel communication IR nodes with grid parallel communication IR nodes where doing so would result in more efficient target code. The grid parallel communication IR nodes represent target code to carry out parallel communication instructions with grid communication. The back end generates target code from the optimized IR tree.

16 Claims, 18 Drawing Sheets

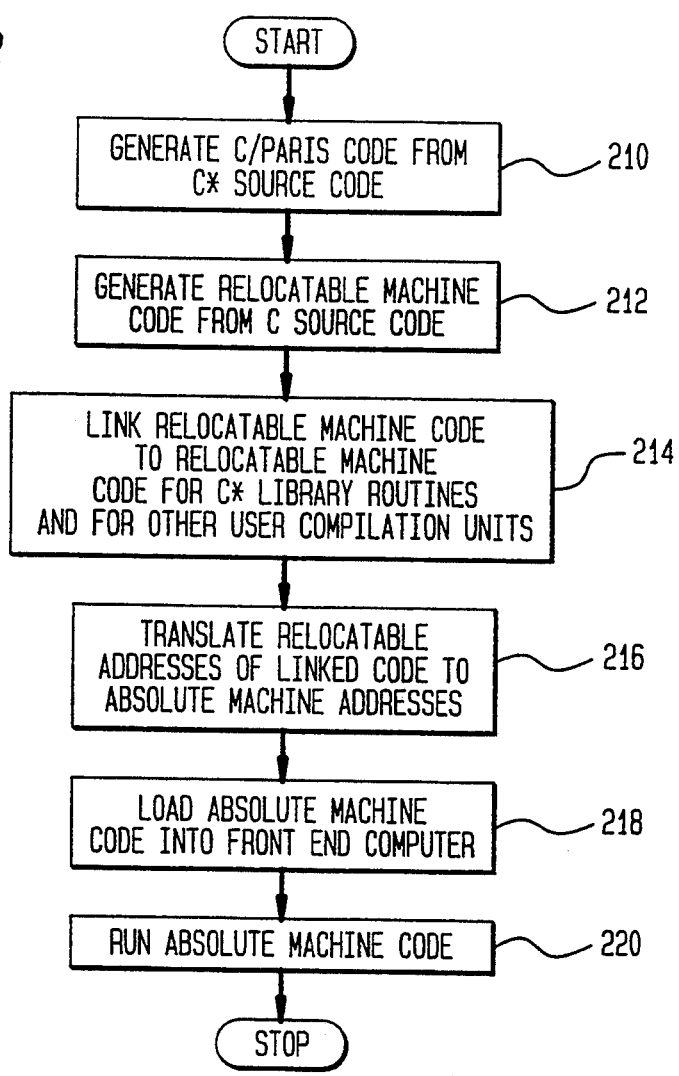
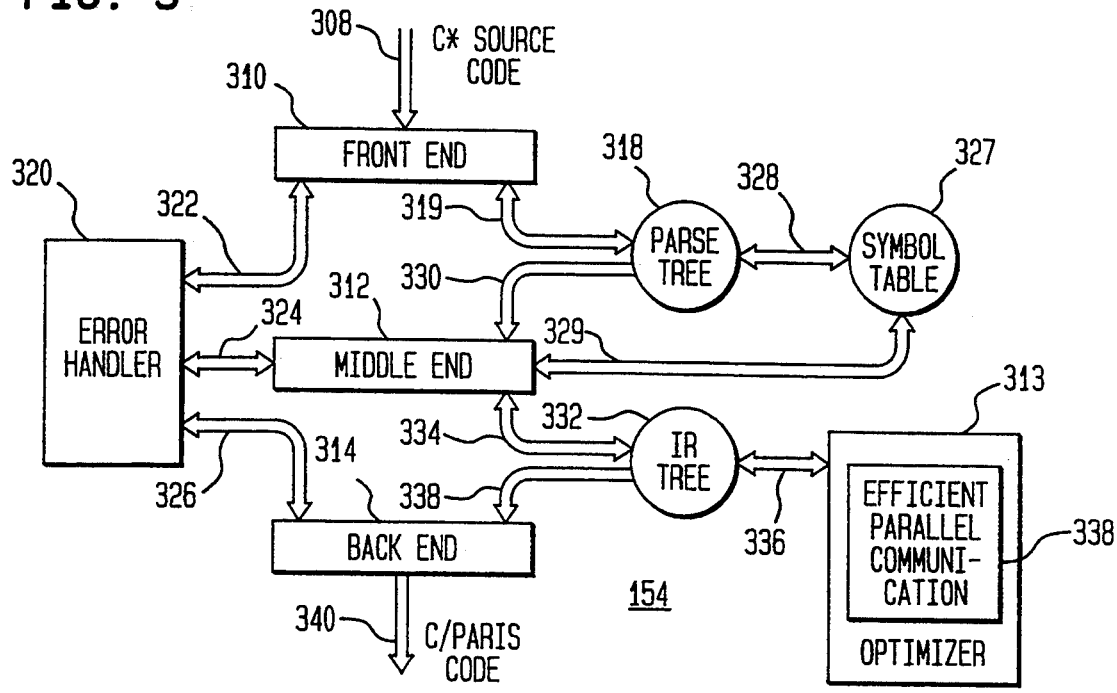

SYSTEM FOR COMPILING PARALLEL COMMUNICATIONS INSTRUCTIONS INCLUDING THEIR EMBEDDED DATA TRANSFER INFORMATION

CROSS-REFERENCE TO OTHER APPLICATIONS

The following application is assigned to the assignee of the present application:

U.S. Pat. No. 5,050,069, issued Sep. 17, 1991, to W. Daniel Hillis, entitled "Method and Apparatus for Simulating M-Dimensional Connection Networks in an N-Dimensional Network Where M is Less Than N", incorporated herein by reference.

The following applications of common assignee contain some common disclosure, and are believed to have an effective filing date identical with that of the present application.

U.S. patent application Ser. No. 07/788,004, filed Nov. 5, 1991, entitled "SYSTEM AND METHOD FOR PARALLEL VARIABLE OPTIMIZATION", now pending, incorporated herein by reference.

U.S. patent application Ser. No. 07/788,003, filed Nov. 5, 1991, entitled "SYSTEM AND METHOD FOR SHAPE SELECTION AND CONTEXTUALIZATION", now abandoned in favor of application Ser. No. 08/126,132, filed Sep. 24, 1993, incorporated herein by reference.

INCORPORATION BY REFERENCE

U.S. Pat. No. 4,589,400, issued Jul. 1, 1986, to W. Daniel Hillis, for "Method and Apparatus for Routing Message Packets", and assigned to the assignee of the present application, incorporated herein by reference.

U.S. Pat. No. 4,984,235, issued Jan. 8, 1991, to Hillis et al., for "Method and Apparatus for Routing Message Packets and Recording the Routing Sequence", and assigned to the assignee of the present application, incorporated herein by reference.

BACKGROUND OF THE INVENTION

1. Field of the Invention

The present invention relates generally to a compiler and, more particularly, to a compiler for a data parallel computer.

2. Related Art

A data parallel computer has an array of many parallel processors, each with some associated memory and all acting under the direction of a serial computer called a host. The parallel data computer supports parallel values having multiple data points called positions. The value of a position is called an element. Each parallel processor stores the element of for one such position in its local memory.

All of the parallel processors (or a subset of the parallel processors) can perform a single operation on all of the positions of a parallel value simultaneously. Such an operation is called a parallel operation.

Each of the parallel processors is assigned an identifier. The assignments are made so that the distance between any two parallel processors is indicated by the difference between their identifiers. The direction from a first parallel processor to a second parallel processor is referred to as upward if the identifier of the first parallel processor is less than that of the second and downward if the identifier of the first parallel processor is greater than that of the second.

An offset from a first parallel processor to a second parallel processor is the identifier of the second parallel processor minus the number of the first parallel processor. Note that the offset has both a distance and a direction component on a data parallel computer whose communications network is implemented as a hypercube. The nearest neighbors of the first parallel processor are those parallel processors whose identifiers differ from that of the first parallel processor by a power of two.

Once a parallel operation has been performed, results must be distributed among the parallel processors. The distribution is carried out by transmitting the data over a data router. The data router is more fully described in the above-referenced U.S. Patent Application entitled "Method And Apparatus For Simulating M-Dimensional Connection Networks In An N-Dimensional Network Where M is Less Than N".

On some data parallel computers, there are two techniques by which data can be transferred on the data router. The first technique is called general communication. General communication is carried out by transmitting data from specified source parallel processors to a specified destination parallel processor.

The second technique is called grid communication. Grid communication is carried out by transmitting data from specified source parallel processors along a specified path. The path can be specified with an offset and an axis. Grid communication is generally substantially faster than general communication. Accordingly, parallel communication instructions should generally be carried out with grid communication where possible.

Distribution of the results of a parallel operation is specified by parallel communication instructions. A compiler for a data parallel computer must determine how data is to be distributed among the parallel processors. That is, it must determine what data should be sent where. Such a compiler must further generate target code for efficiently carrying out the parallel communication instructions.

A first conventional compiler for a data parallel computer analyzes source code having no explicit description of how data is to be distributed among the data processors and automatically generates parallel communication instructions in the target code. The programmer can thus write source code as if for a serial computer. However, the efficiency of the parallel communication instructions generated is limited by the amount of information about the data that the compiler can determine from the source code. Furthermore, the analysis necessary to generate the parallel communication instructions requires substantial overhead. Accordingly, the first conventional compiler generates executable code with mediocre performance characteristics and requires a substantial amount of computation time to generate target code.

A second conventional compiler for a data parallel computer enables the programmer to explicitly specify the distribution of data to the various parallel processors with the use of object-oriented domains. Because the programmer generally knows more about how the data will be used than a compiler would normally be able to determine from the source code, the second conventional compiler generally generates more efficient target code than the first conventional compiler. Furthermore, because the programmer specifies the distribution of data to the parallel processors, the second conventional compiler performs less analysis of the source code and therefore requires less overhead. However, the second conventional compiler forces the programmer to use the object-oriented model of computation. Many programmers are unfamiliar with the object-oriented programming model. Also, many applications are not well suited to the object-oriented programming model.

Therefore, what is needed is a compiler for a data parallel computer which incorporates the benefits (but not the drawbacks) of both the first and second conventional compilers for data parallel computers. Specifically, what is needed is a compiler which generates object code that effectively distributes the data among the parallel processors, efficiently transfers the data over the router network among the parallel processors, does not require an inordinate amount of compilation time, and does not require the use of an unconventional programming model.

SUMMARY OF THE INVENTION

Accordingly, the present invention is directed toward a method and apparatus for processing a program written in a high level language (HLL) which has been extended to support parallel communication. The HLL could be, for example, ANSI/ISO standard C. The extended HLL could be version 6.0 of C*, which is based on ANSI/ISO standard C. The extensions to the HLL enable the programmer to explicitly specify data communication operations and thereby minimize overhead and maximize performance. A preferred hardware environment of C* is a data parallel computer such as the CM-1, CM-2 or the CM-5, all of which are manufactured by Thinking Machines Corporation.

The compiler of the present invention essentially comprises a front end, a middle end, an optimizer, and a back end. The front end constructs a parse tree which includes nodes representative of parallel communication instructions. Parallel communication instructions are either send instructions or get instructions.

The send instruction has the form:

[left_index_expression]destination_expression=-
source_expression

The get instruction has the form:

destination_expression=[left_index_expression]-
source_expression

The left_index_expression of the send instruction and the get instruction represents one or more left index parallel values, each of which is made up of left index positions. The destination_expression represents a destination parallel value made up of destination positions. The source_expression represents a source parallel value made up of source positions.

The send instruction describes the following distribution of data among the parallel processors. The contents of each left index position specifies a destination position. For each left index, each parallel processor transmits a copy of the element of the source parallel value stored on it to the position of the destination parallel value on the parallel processor indicated by the element of the left index parallel value which is stored on the transmitting parallel processor.

The get instruction describes the following distribution of data among the parallel processors. The contents of each left index position specifies a source position. For each left index, each parallel processor transmits a copy of the element of the source parallel value stored on it to the position of the destination parallel value on the parallel processor indicated by the left index. Specifically, the indicated position of the destination parallel value is that which is on the parallel processor on which the element of the left index which identifies the transmitting parallel processor is stored.

From the parse tree, the middle end generates an intermediate representation (IR) tree of IR nodes. In doing so, the middle end evaluates the source_expression so as to determine the source parallel value. It evaluates the destination_expression so as to determine the destination parallel value. It evaluates the left_index_expression so as to determine the left index parallel values. With the source parallel value, the destination parallel value and the left index parallel values, the middle end generates general communication IR nodes representative of target code to carry out parallel communication instructions with general communication.

The general communication IR nodes include IR nodes representative of target code to generate a parallel variable called "send_address" for each left index. Each element of "send_address" identifies an address on a destination parallel processor. At run time, each parallel processor sends the element of the source parallel value stored on it to the position of the destination parallel value identified by the element of "send_address" stored on the transmitting parallel processor.

When generating target code for a data parallel computer 110 which is capable of carrying out or emulating both general communication and grid communication, and efficient parallel communication module of the optimizer operates as follows. The efficient parallel communication module replaces the parallel general communication IR nodes with grid communication IR nodes where doing so is possible and would result in more efficient target code. The grid communication IR nodes represent target code to carry out parallel communication instructions with grid communication.

The grid communication IR nodes include IR nodes for target code to determine an offset which identifies a path from each parallel processor. At run time, each parallel processor sends the element of the source parallel value stored on it to the destination position on the parallel processor indicated by the path.

Grid communication is only possible if the left index parallel values indicate a regular mapping from the positions of source parallel values to the positions of destination parallel values. As stated, group communication is only possible on certain data parallel computers. Grid communication will not be efficient if the path identified involves the sequential transmission over many wires. (The wires connect the parallel processors to one another.)

Finally, the back end generates target code from the optimized IR tree.

BRIEF DESCRIPTIONS OF THE DRAWINGS

The present invention will be more fully understood with reference to the accompanying drawings in which:

FIG. 2 is a high level flow chart of the method of the environment of FIG. 1;

FIG. 3 is a block diagram of the structure of the C* compiler of FIG. 1;

DETAILED DESCRIPTION OF THE PREFERRED EMBODIMENTS

Table of Contents

1. Environment
2. Overview of Parallel Communication Instructions
3. Overview of C* Compiler
4. Parse Tree Construction
   a. Overview
   b. Semantic Analysis
5. IR Code Generation
   a. Structure and Method
   b. Example
6. Parallel Communication Instruction Optimization
   a. Overview of Efficient Parallel Communication
   b. Structure and Method
   c. Example
7. Decomposition of Offsets into Grid Communication Steps
8. Operation of News_or_Send and News_or_Get Routines
9. Generation of Paris Calls for Minimal Set
10. C/Paris Code Generation
    a. Overview
    b. Examples
    i. C/Paris Code for Example 1
    ii. C/Paris Code for Example 2
    iii. C/Paris code for Example 3
    iv. C/Paris code for Example 4
11. Execution of Parallel Communication Instructions
    a. Send Instruction
    b. Get Instruction
12. 11. Conclusion

1. Environment

The present invention is directed toward a compiler for processing parallel communication instructions on a data parallel computer. In a preferred environment of the present invention, the data parallel computer is one manufactured by Thinking Machines Corporation, such as the CM-1, CM-2, and CM-5 (wherein CM stands for Connection Machine). These and other preferred environments of the present invention are described in U.S. Pat. No. 4,589,400 to Hillis, U.S. Pat. No. 4,984,235 to Hillis et al., and U.S. Pat. No. 5,050,069, issued Sep. 17, 1991, entitled "Method and Apparatus for Simulating M-Dimensional Connection Networks in an N-Dimensional Network Where M is Less Than N", filed Apr. 27, 1987, by Hillis, all of which were cited above.

Figure 1:
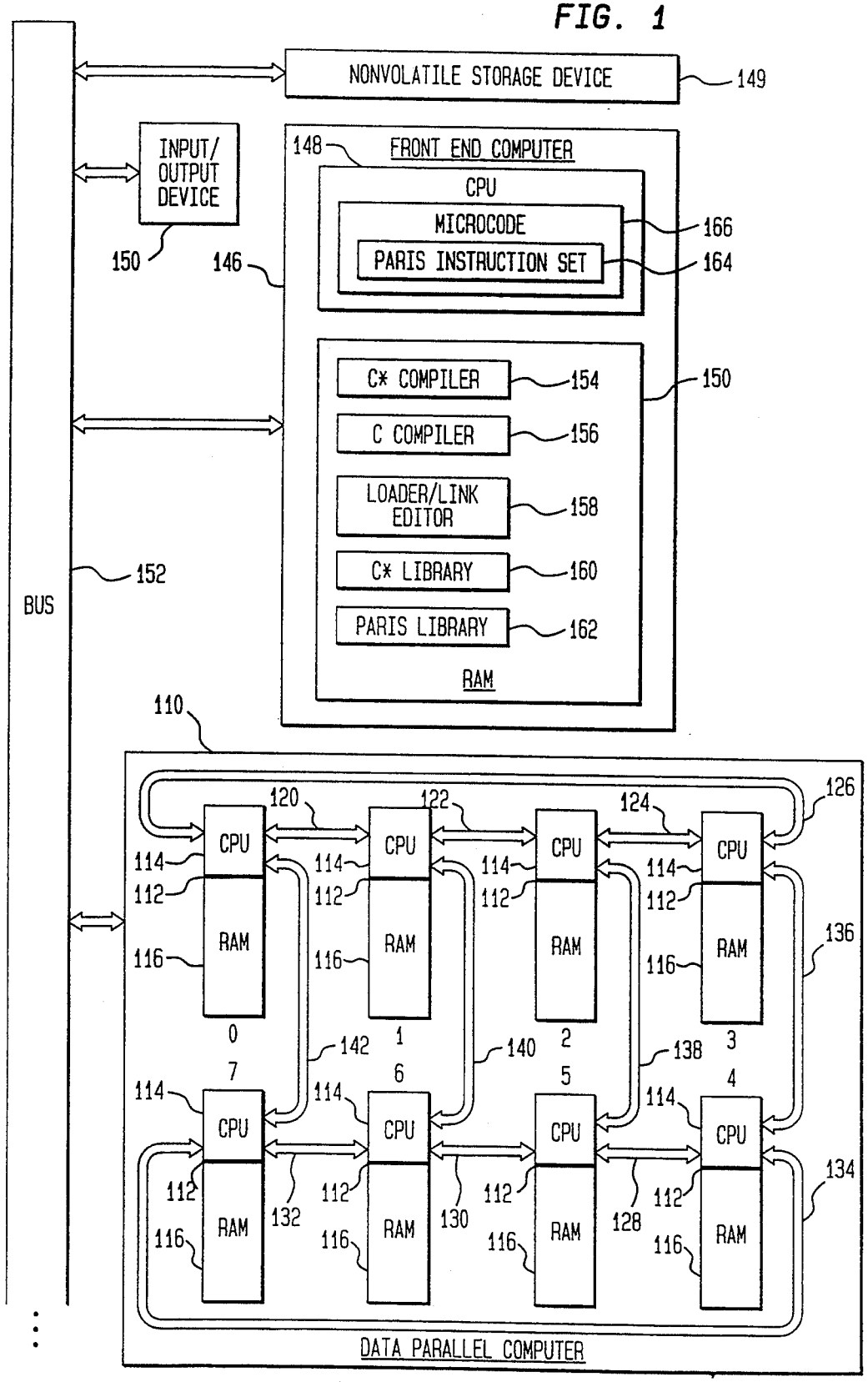
FIG. 1 is a block diagram of the environment in which the present invention operates.

FIG. 1 shows a block diagram representative of the structure of a preferred environment in which the present invention could operate. To facilitate explanation, a block diagram shows a simplified view of the actual structure of the preferred embodiment. A data parallel computer 110 is comprised of an array of parallel processors 112. The number of parallel processors in an actual data parallel computer 110 might range from 2,048 to 65,536, for example. For clarity, the data parallel computer 110 illustrated has only eight parallel processors 112 (parallel processor$_0$ to parallel processor$_7$). Each parallel processor 112 has a CPU 114 and a random access memory (RAM) 116.

In the data parallel computer 110, each of the parallel processors 112 is directly connected to three other parallel processors 112 by paths. For example, the parallel processor$_0$ 112 is directly connected to the parallel processor$_2$ 112 via a path 120, the processor$_3$ 112 via a path 126, and the parallel processor$_7$ 112 via a path 142. The direct connections are such that no more than two paths need be used to send data between nearest-neighbor parallel processors 112.

The data parallel computer 110 is electrically connected to a host computer 146, to a non-volatile storage device 148, and to an input/output device 150 via a bus 152.

The host computer 146 is a serial computer such as a Sun 4 (manufactured by Sun Microsystems, Inc.) or a VAX (manufactured by Digital Equipment Corp.). The host computer 146 comprises a single host CPU (or a small number of CPUs) 148 and a RAM 150.

The environment of the present invention further includes various software modules and a firmware module. The software modules include a C* compiler 154 (such as The Thinking Machines Corporation C* Compiler Version 6.0) a C compiler 156, a loader/link editor 158, a C* library 160 and a Paris library 162. The software modules could reside in the RAM 150, in the non-volatile storage device 149 or in some combination of the two. In FIG. 1 the software modules are shown in the RAM 150. The firmware module (a Paris instruction set 164) resides in a microcode 166 of the host CPU 148.

As noted above, C* is an extension of ANSI/ISO C in that C* supports parallel instructions and parallel data types. Such extension of ANSI/ISO C is achieved via use of a native instruction set of the data parallel computer. One such native instruction set is a Paris language. The Paris language is a low-level instruction set for programming the data parallel computer. The Paris language is described in the Thinking Machines Corporation documents *Paris Reference Manual* (Version 6.0, February 1991) and *Revised Paris Release Notes* (Version 6.0, February 1991), which are herein incorporated by reference in their entireties. These documents are available from the Thinking Machines Corporation Customer Support Department at 245 First Street, Cambridge, Mass.

The Paris instruction set 164 and the Paris library 162 implement the Paris language. The Paris instruction set 164 and the Paris library 162 are part of the system software for the Connection Machine® Model CM2 TM Supercomputer.

The C* language is described in detail in the Thinking Machines Corporation publication *Programming in C**, which is hereby incorporated by reference as if set forth in full below. This document is also available from the Thinking Machines Corporation Customer Support Department at 245 First Street, Cambridge, Mass.

Note that the host computer 146 executes statements of the above software modules (as well as any other software) which do not involve parallel values. The host computer 146 transmits any statements which do involve parallel value to the data parallel computer 110 for it to execute.

FIG. 2 is a flow chart which illustrates the relationship between the software modules 154, 156, 158, 160 and 162 and the Paris instruction set 164 of FIG. 1. The flow chart of FIG. 2 also shows the method of the current invention on a high level. Looking at FIG. 2, in a step 210 the C* compiler 154 instructs the host computer 146 so as to generate C/Paris code from C* source code. C/Paris code is made up of C source code, calls to functions in the C* library 160 and calls to functions in the Paris library 162. In a step 212, the C compiler 156 instructs the host computer 146 so as to generate relocatable machine code from the C/Paris code. In a step 214, the loader/link editor 158 instructs the host computer 146 so as to link the relocatable machine code generated by the C compiler 156 to user compilation units and to compilation units of the C* library 160 and the Paris library 162 to generate linked machine code. The loader/link editor 158 is a conventional loader/link editor.

In a step 216 the loader/link editor 158 translates the relocatable addresses in the linked machine code to absolute machine addresses so as to generate absolute machine code. In a step 218, the loader/link editor 158 loads the absolute machine code into the host computer 146. In steps 220 and 222, the host computer 146 runs serial instructions of the absolute machine code and dispatches parallel instructions to the data parallel computer 110 as specified by the Paris instruction set 164. In a step 224, the data parallel computer 110 executes the parallel instructions.

Note that the C* compiler 154 could have instead been designed to instructs the host computer 146 so as to generate relocatable machine code from C* source code. However, if it did so, the target code generated by the C* compiler 154 would be less portable.

Note also that the data parallel computer 110 provides virtual processors. Accordingly, it can divide up the memory associated with each parallel processor 122 to create multiples of the entire set of parallel processors 112. For example, if the data parallel computer 110 had 16K parallel processors 112, it could be operated to emulate a data parallel computer 110 with 32K, parallel processors 112, 64K parallel processors 112, and so on.

2. Overview of Parallel Communication Instructions

Send instructions and get instructions specify communication between source parallel processors specified by source parallel values and destination parallel processors specified by destination parallel values. Each parallel value is of a programmer-specified shape. The shape is a template for logically configuring data among the parallel processors 112. The shape is defined by the number of its dimensions, and by the number of positions in each of its dimensions. The number of dimensions is referred to as the shape's rank. For example, a shape of rank 2 has two dimensions. A dimension is also referred to as an axis. The number of positions of the shape is the product of its rank and the number of positions in each of its dimensions.

An example of a declaration of a shape in a program is shape [2][32768]ShapeA;

This declaration declares a two-dimensional shape called ShapeA. ShapeA has 2 positions along axis 0 (the first dimension) and 32,678 positions along axis 1 (the second dimension). The total number of positions in ShapeA is 65,356.

Shapes can be declared in programs with other numbers of dimensions. Each additional dimension is represented by another number in brackets, to the right of the previous dimensions.

A parallel variable is a named identifier of a parallel value. An example of a declaration of a parallel variable of ShapeA in a program is:

int p1:ShapeA

This statement declares a parallel variable called p1 that is of shape ShapeA. The elements of p1 are integers, as indicated by the legend "int". The parallel variable p1 has 65,356 elements, one for each position of ShapeA.

A single element of a shape or parallel value can be identified using bracketed values as coordinates. When used with a parallel value, the bracketed values are called left indices, and are written to the left of the parallel value. For example, [1][2]p1 is the position of p1 at coordinate 1 along axis 0 and coordinate 2 along axis 1.

A single element of a parallel value can thus be thought of as a single scalar value. (A scalar value is a value which consists of only one item—one number, one character, and so on.) But the advantage of expressing the collection of scalar values as a parallel value is that it enables an instruction to be efficiently carried out on all elements (or any subset of elements) of a parallel value simultaneously.

The parallel processors can only carry out parallel operations on a parallel value after its shape has been selected as current in the program. This is done with a "with" statement in the program. The C* statement:

with(ShapeA)

selects ShapeA as current.

The results of parallel operations are communicated among the parallel processors with send and get operations (i.e., the operations associated with send and get instructions). The send instruction has the form:

[left_index_expression]destination_expression=source_expression

The get instruction has the form:

destination_expression=[left_index_expression]source_expression

The left_index_expression of the send instruction and the get instruction represents one or more left index parallel values, each of which is made up of left index positions. The destination_expression represents a destination parallel value made up of destination positions. The source_expression represents a source parallel value made up of source positions.

The send instruction describes the following distribution of data among the parallel processors. The contents of each left index position specifies a destination position. For each left index, each parallel processor transmits a copy of the element of the source parallel value stored on it to the position of the destination parallel value on the parallel processor indicated by the element of the left index parallel value which is stored on the transmitting parallel processor.

The get instruction describes the following distribution of data among the parallel processors. The contents of each left index position specifies a source position. For each left index, each parallel processor transmits a copy of the element of the source parallel value stored on it to the position of the destination parallel value on the parallel processor indicated by the left index. Specifically, the indicated position of the destination parallel value is that which is on the parallel processor on which the element of the left index which identifies the transmitting parallel processor is stored.

Send instructions, get instructions, and other aspects of C* are described in greater detail in the Thinking Machines Corporation publication entitled *Programming in C*.*

3. Overview of C* Compiler

Figure 5:
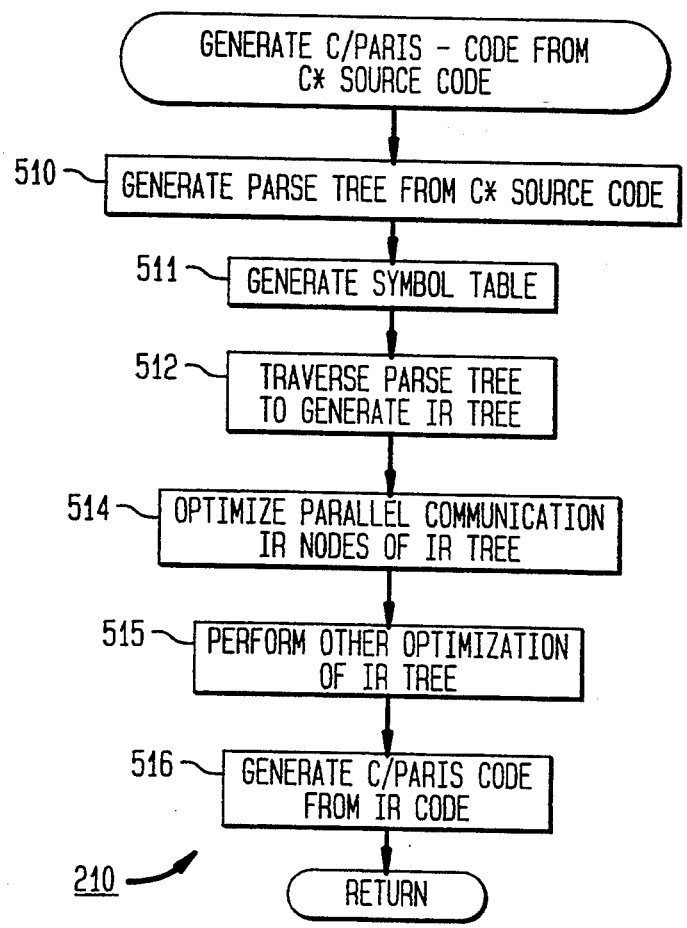
FIG. 5 is a more detailed flow chart of a step 210 of FIG. 2 of generating C/Paris code from C* source code.

FIG. 3 is a high level block diagram of the structure of the C* compiler 154 of FIG. 1. As FIG. 3 shows, the C* compiler 154 essentially comprises a front end 310, a parse tree 312, a middle end 314, an optimizer 313, a back end 318 and an error handler 320. FIG. 5 is a flow chart which illustrates the interaction between the modules of FIG. 3. The flow chart of FIG. 5 also illustrates the detailed method of the step 210 of FIG. 2 of generating C/Paris code from C* source code.

Looking also at FIG. 5, in a step 510 the front end 310 receives C* source code via a path 320 and generates a parse tree 312. The detailed structure and method of the front end 310 will be described in greater detail in FIGS. 4, 6, 7 and 8 and the accompanying text. The front end 310 communicates with the parse tree 318 via a path 319. If the front end 310 detects any errors while constructing the parse tree 318, it communicates then to the error handler 320 via a path 322.

In a step 511, the parse tree 318 generates a single table 327. Note that steps 510 and 511 are carried out concurrently. The symbol table 327 contains information about identifiers. Specifically, it contains the name, type, parallel nature, shape and scope of identifiers. The parse tree 318 communicates with the symbol table 327 via a path 328.

In a step 512, the middle end 312 receives data from the parse tree 318 (via a path 330) and from the symbol table 327 (via a path 329) and generates an IR tree 332 of IR nodes. If the middle end 312 detects any errors while generating the IR tree 332, it communicates them to the error handler 320 via a path 322. The detailed method of the middle end 612 will be explained in greater detail in FIG. 9 and the accompanying text. The middle end 312 communicates with the IR tree 332 via a path 334.

In a step 514, an efficient parallel communication module 338 of the optimizer 313 optimizes parallel communication IR nodes of the IR tree 332. Specifically, the efficient parallel communication module 338 replaces IR nodes on the IR tree 332 which specify general parallel communication with IR nodes which specify grid communication where doing so is possible and would result in more efficient target code. Structure of the efficient parallel communication module 332 is explained in greater detail in FIG. 12 and the accompanying text. The method of the efficient parallel communication module 332 is explained in greater detail in FIGS. 13–15 and the accompanying text.

In a step 515, the optimizer 313 performs IR tree 332 optimization not handled by the efficient parallel communication module 338. The optimizer 313 communicates with the IR tree 332 via a path 336.

The back end 314 receives data from the IR tree 322 via a path 338. In a step 516, the back end 314 generates C/Paris code from the IR nodes of the IR tree 332. If the back end 314 detects any errors while generating C/Paris code, it communicates them to the error handler 320. The back end 314 places the C/Paris code on a path 340.

4. Parse Tree Construction a. Overview

Figure 4:
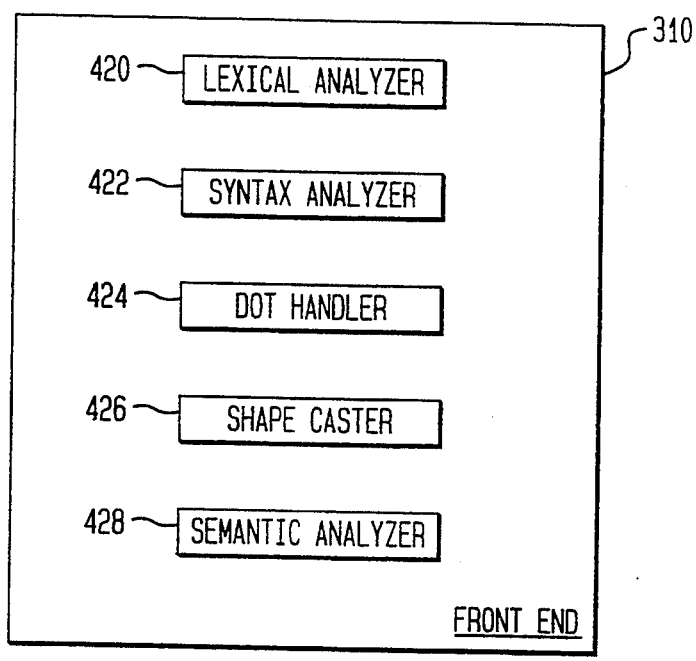
FIG. 4 is a block diagram of a front end of the C* compiler of FIG. 1.

Parse tree construction is performed by the front end 310. FIG. 4 is a block diagram of the detailed structure of the front end 310. Looking at FIG. 4, the front end 310 comprises a lexical analyzer 420, a syntax analyzer 422, a dot handler 424, a shape caster 426 and a semantic analyzer 428.

Figure 6:
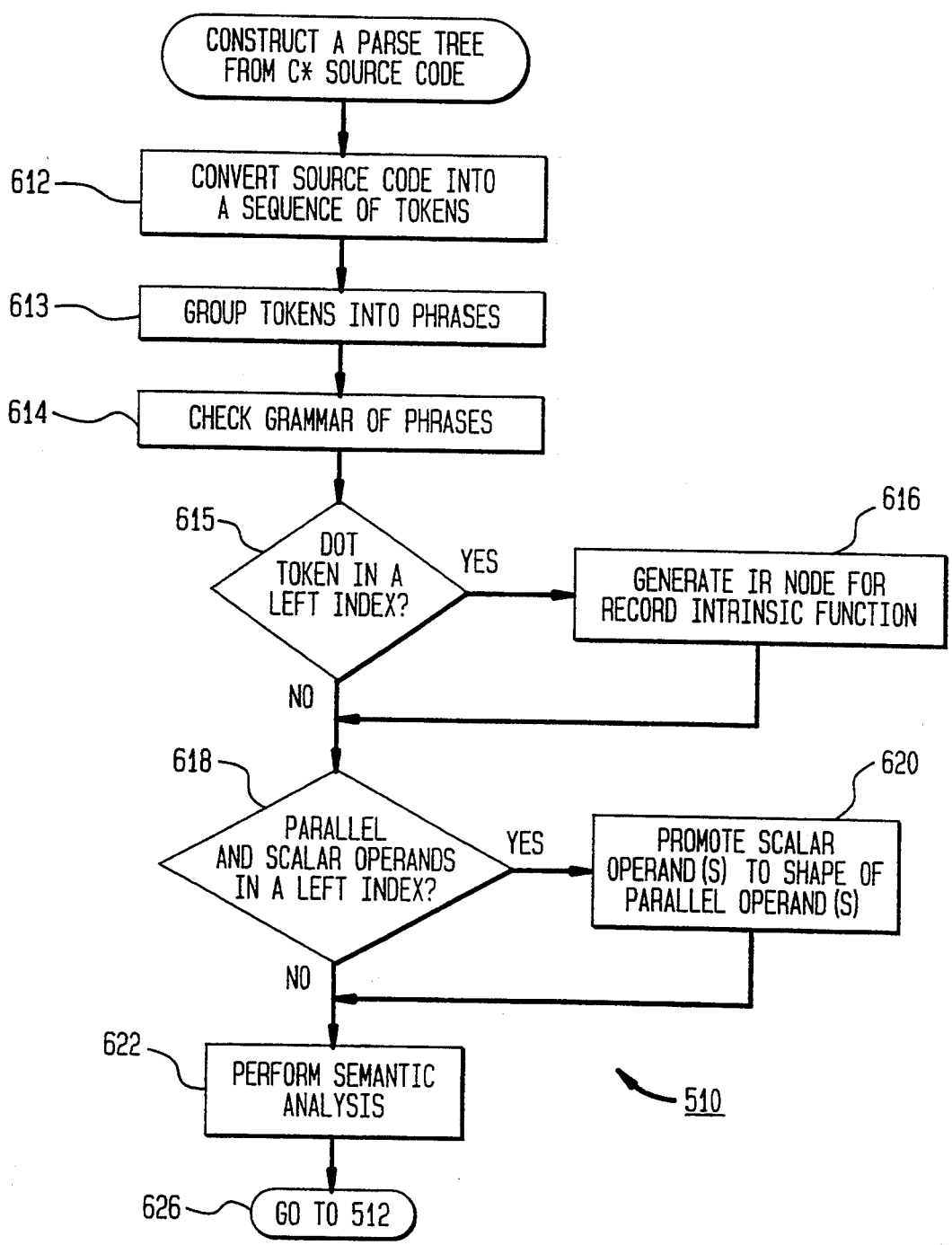
FIG. 6 is a more detailed flow chart of a step 510 of FIG. 5 of constructing a parse tree from C* source code.

FIG. 6 is a flow chart which illustrates the details of step 414 of FIG. 4 (constructing the parse tree from the source code). FIG. 6 also illustrates the detailed method of the front end 310. Note that the C* compiler 154 does not carry out the steps of constructing the parse tree entirely serially. Instead, it carries out each of the steps of constructing the parse tree 318 on a portion of the C* source code before carrying out the subsequent step.

Referring now to FIG. 6, in a step 612, the lexical analyzer 420 of FIG. 4 divides the C* source code into a plurality of tokens. A token is a sequence of characters having a collective meaning. Examples of tokens include an operator, a number, a bracket, a parenthesis or the character or characters comprising an identifier. The lexical analyzer 420 performs the function in a manner similar to a lexical analyzer for a conventional compiler.

In a step 613, the syntactic analyzer 422 groups the tokens into grammatical phrases. An example of a grammatical phrase is an operator and its source and destination operands.

In a step 614, the syntactic analyzer 422 checks the grammar of the phrases. It would, for example, see that a portion of the parse tree 318 representative of a binary operator included two source operands and a result that might be used as an operand of another operation.

The functions performed in steps 613 and 614 are known in the art as syntactic analysis. The syntactic analyzer 422 performs function in a manner similar to a lexical analyzer for a conventional compiler.

In a step 615, the dot handler 424 identifies any parse tree portion in which a dot token (written ".") occurs in a left index of a C* program.

The pcoord intrinsic function is part of the C* library 160. The pcoord intrinsic function returns causes the data parallel computer 110 to generate a parallel value of the shape which has been selected as current in the block of the program from which the function is called. Each element of the parallel value is initialized to its self coordinate along an axis specified by the parameter.

For example, if the current shape was ShapeA (defined above) and the pcoord intrinsic function was called with a parameter of one, it would cause a parallel value to be generated which was of shape ShapeA and in which element [0][0] was 0, [0][1] was 1, [0][32767] was 32,767, [1][0] was 0, [1][1] was 1 and [1][32767] was 32,767. If, on the other hand, the pcoord intrinsic function was called with a parameter of zero, elements [0][0], [0][1] and [0][32767] would be 0, and elements [1][0], [1][1] and [1][32767] would be 1. The dot token is explained in greater detail in the above-cited Thinking Machines Corporation publication *Programming in C\**.

If the C* compiler 154 finds any dot tokens on left index parse tree portions, then in a step 616 the dot handler 424 generates for each dot token an IR node for a call to a pcoord intrinsic function. The pcoord IR node includes an operand for the parameter of the pcoord intrinsic function. The operand specifies the axis addressed by the left index in which the dot token occurred.

If there are no dot tokens, or after carrying out step 615, then in a step 618 the shape caster 426 searches the parse tree portions for a left index having at least one parallel operand and at least one scalar operand. An example of such a left index is: "pvar+1", where pvar is a parallel variable. If there is such a left index, then in a step 620 the shape caster 426, for each such scalar operand, adds to the appropriate parse tree portion a node for an operation which at run time will promote the scalar operand(s) to the shape of the parallel operand(s).

If there are no such left indices, or after carrying step 620, then in a step 622 the semantic analyzer 428 performs semantic analysis on the parse tree portions. Semantic analysis involves ensuring that the components of the program fit together meaningfully. Semantic analysis includes, for example, detecting the use of undeclared variables and detecting when an operation has an operand of an inappropriate type. The detailed method of semantic analysis is presented by FIG. 7 and the accompanying text.

After semantic analysis in step 622, C* compiler 154 flow of control goes to step 512 of FIG. 5.

b. Semantic Analysis

Figure 7:
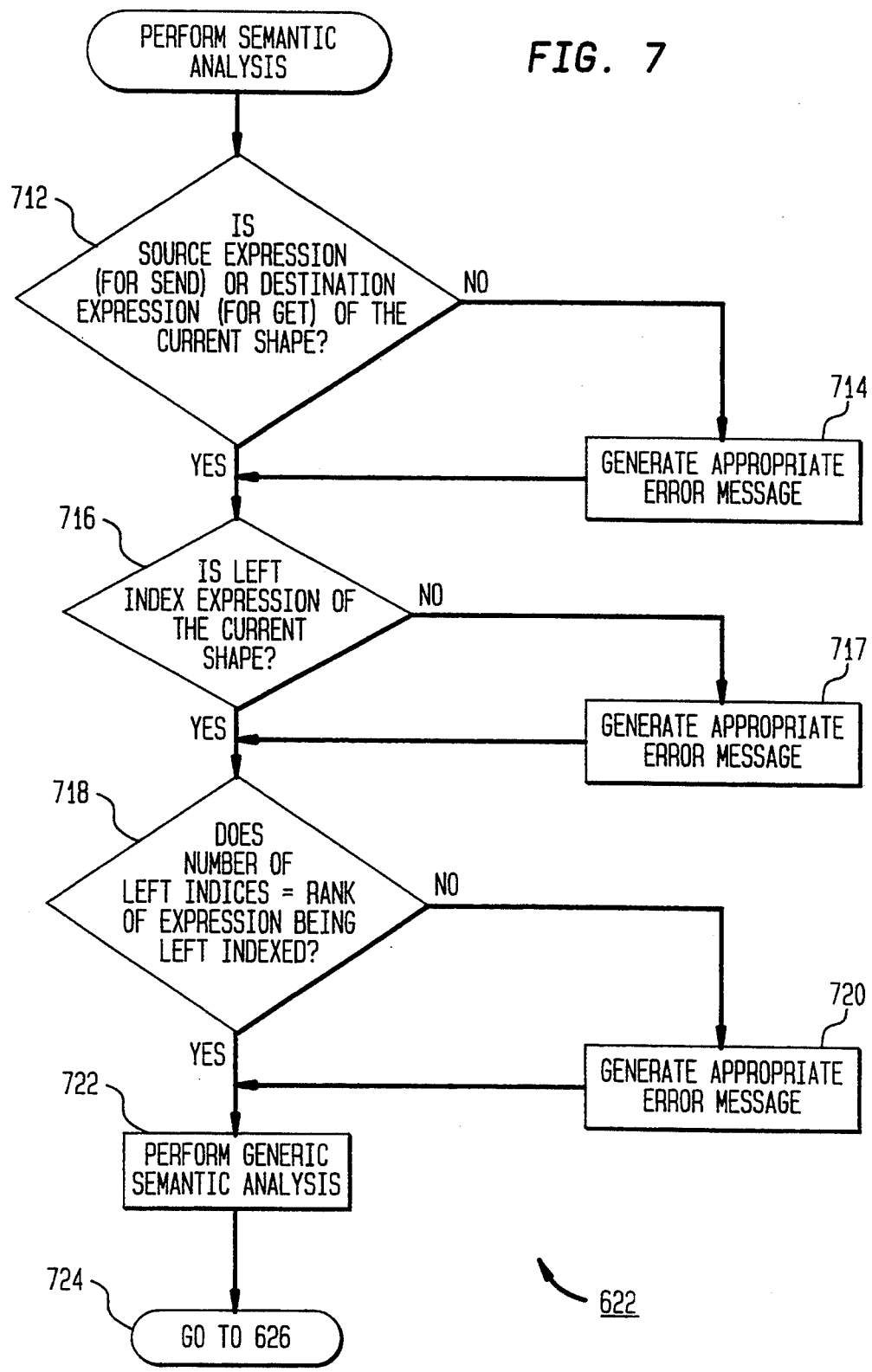
FIG. 7 is a more detailed flow chart of a step 622 of FIG. 6 of performing semantic analysis.

FIG. 7 shows a flow chart which illustrates the details of step 622 of FIG. 6 (performing semantic analysis). FIG. 7 also shows the detailed operation of the semantic analyzer 428 of FIG. 4.

In a step 712, the semantic analyzer 428 locates the source expression (for a send) or the destination expression (for a get) on the parse tree 318 and determines whether it is of the current shape. If it is not, then in a step 714 the semantic analyzer 428 invokes the error handler 320 to generate an appropriate error message.

If the source expression is of the current shape, or after carrying out step 714, then in a step 716 the semantic analyzer 428 locates the left index expression on the parse 318 tree and determines whether all the associated left indices are of the current shape. If any are not, then in a step 717 the semantic analyzer 428 invokes the error handler 320 to generate an appropriate error message.

If all of the left indices are of the current shape, or after carrying out step 717, then in a step 718 the C* compiler 154 semantic analyzer 428 determines whether the number of left indices in the left index expression equals the number of dimensions (i.e., the rank) of the destination expression being left indexed. The expression being left indexed is the destination expression, for a send instruction, or the source expression, for a get instruction. If the numbers are not equal, then in a step 720 the semantic analyzer 428 invokes the error handler 320 to generate an appropriate error message.

If the numbers are equal, or after carrying out step 720, then in a step 722, the semantic analyzer 428 performs any semantic analysis which is not specific to parallel communication. Note that the generic semantic analysis could also be performed concurrently with the above parallel communication specific semantic analysis steps. C* compiler 154 flow of control then goes to step 626 of FIG. 6.

a. Example of Parse Tree Construction

Figure 8:
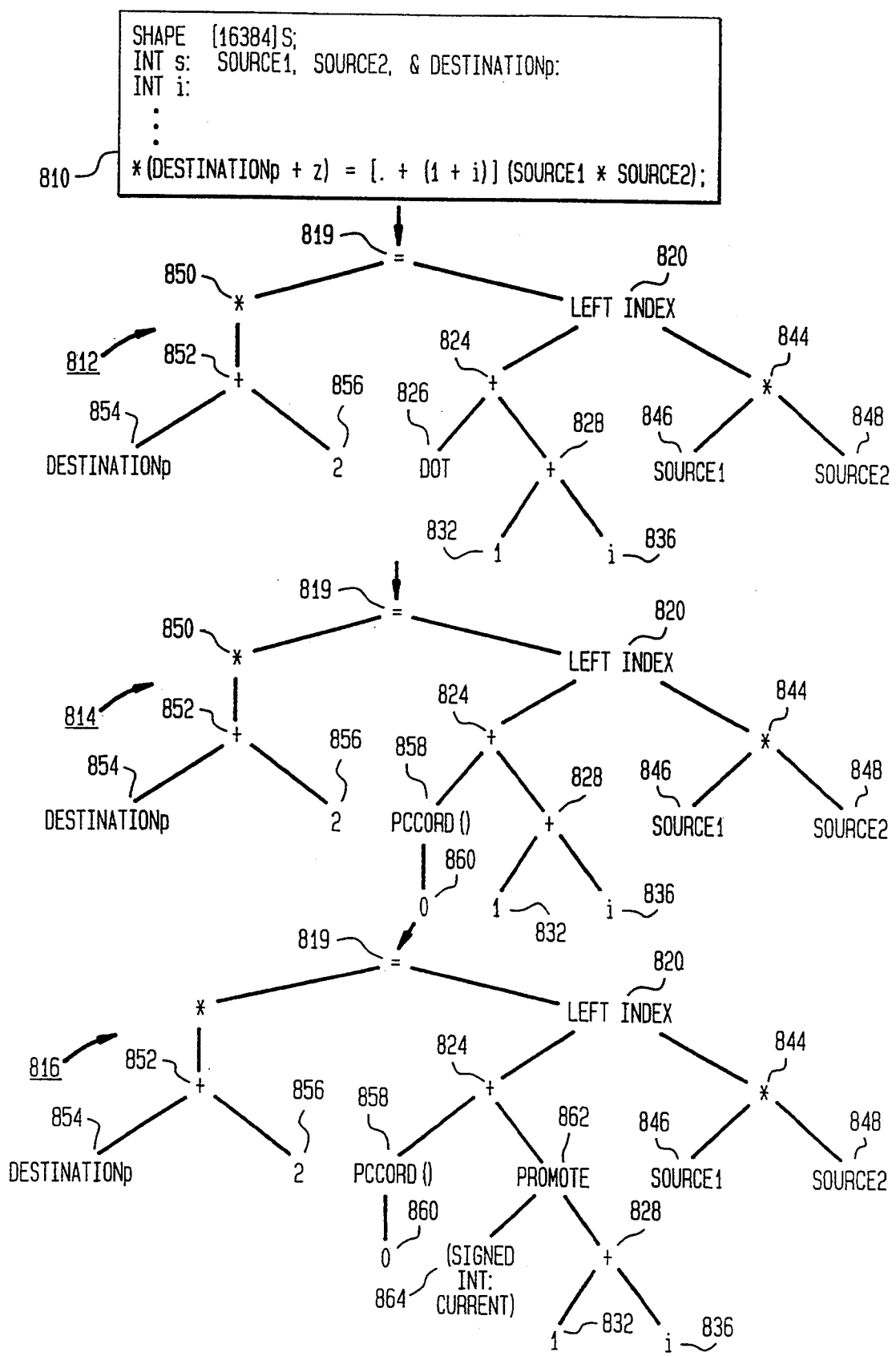
FIG. 8 shows how a parse tree of the C* compiler of FIG. 1 would be constructed for a get instruction.

FIG. 8 shows an example of how parse trees would be constructed for a first example 810 of a get instruction. Specifically, FIG. 8 shows a first parse tree 812 on which the first example 810 has been tokenized and grouped into phrases, a second parse tree 814 on which a dot token in the first example 810 has been replaced by a call to the pcoord intrinsic function call, and a third parse tree 816 on which a type cast has been inserted. Note that the C* compiler 154 generally would not complete the parse trees 812 before constructing the parse tree 814; nor would it complete the parse tree 814 before constructing the parse tree 816.

```
shape [16384]S;
int:S source1, source2, *destinationp;
int: i;
main( ) {
    with(S)
        *(destinationp + 2)=[. + (1+i)](source1*source2);
}
```

In the first example, the shape S has one dimension and 16,384 positions. Parallel variables source1 and source2 are of shape S and have integer elements. The third variable, destinationp, is a pointer to a parallel variable of shape S which has integer elements. The "with(S)" statement selects shape S as current.

In the get instruction "*(destinationp+2)=[.+(-1+i)](source1 * source2)", the destination expression is "*(destinationp+2)". Adding 2 to the pointer "destinationp" has the effect of offsetting the pointer by two positions. When used as a unary operator, "*" is a dereference operator. The dereference operator treats its operand as the address of the ultimate target, and accesses that address to fetch the contents. The destination expression therefore represents a parallel value which is the third element of the parallel array pointed to by destinationp.

The left index expression consists of a single left index: ".+(1+i)". The "." is the dot token explained above. The parameter to the pcoord intrinsic function generated is the identifier of the left index in which the dot token occurred. The identifier of the first (or only) left index is 0. The function thus returns a parallel value of the current shape in which each element is initialized to its self coordinate along the 0 axis.

In the expression "(1+i)", "i" is a scalar variable whose value cannot be determined at compile time. At run time, the sum "(1+i)" will be added to each element of the parallel value generated by the pcoord intrinsic function. Accordingly, the left index specifies an offset of 1+i.

The source expression of the first example 810 is "source1 * source2", where source1 and source2 are parallel values. When used as a binary operator, "*" is the multiplication operator. When the source operands are parallel values, "*" returns a parallel value having in each position the product of the corresponding elements of its source operands. The source parallel value therefore represents a parallel value in which each element is the product of the corresponding element of source1 and of source2.

The lexical analyzer 420 carries out the steps 612 and 613 of FIG. 6 to break the first example 810 into tokens. The syntax analyzer 422 caries out the steps 613 and 614 of FIG. 6 to group the tokens into phrases and check the grammar of the phrases. The lexical analyzer 420 and the syntax analyzer 422 generate the first parse tree 812 from the first example 810.

The first, second and third parse trees 812, 814 and 816, respectively, have the following structure. Non-leaf nodes represent operators or function calls. Leaf nodes represent source operands (i.e., identifiers or constants), operations with no operands, or function parameters. The root is an assignment operator. The child of a node represents its operand, the operation performed to determine its operand, or its parameter. The left descendant of a node which represents an operator represents the left operand of the operator. The right descendant of a node which represents an operator represents the right operand of the operator. The central descendant of a node which represents an operand represents a sole operand of the operation. Descendants of a node which represents a function call represent parameters to the function.

The root of the parse tree 812 is an "=" node 819, which represents the assignment operator "=" of the first example 810. The left descendants of the "=" node 819 represent the left-hand-side of the first example 810, and the right descendants of the "=" node 819 represent the right-hand-side.

The operation performed to determine the right operand associated with the "=" node 819 is the left index of instruction. The right child of the "=" node 819 is therefore a left index node 820. The operation performed to determine the left operand associated with the left index node 820 is addition. The left child of the left index node 820 is therefore a "+" node 824. The left operand associated with the "+" node 824 is a dot token. The left child of the "+" node 824 is therefore a dot node 826. Because there are no operands to the dot token, the latter node is a leaf node.

The operation performed to determine the right operand associated with the "+" node 824 is addition. The right child of "+" node 824 is therefore a "+" node 828. The left operand associated with the "+" node 832 is the number "1". The left child of the "+" node 832 is therefore a "1" node 834. The right operand associated with the "+" node 832 is the variable "i". The right child of the "+" node 832 is therefore an "i" node 836. Because they represent source operands, the "1" node 834 and the "i" node 836 are leaf nodes.

The operation performed to determine the right operand associated with the left index node 820 is multiplication. The right child of the "+" node 819 is therefore a "*" node 844.

The left operand associated with the "*" node 844 is the parallel variable source1. The left child of the "*" node 844 is therefore a "source1" node 846. Because it represents a source operand, the latter node is a leaf node.

The right operand associated with the "*" node 844 is the parallel variable source2. The right child of the "*" node 844 is therefore a "source2" node 848. Because it represents a source operand, the latter node is a leaf node.

The operation performed to determine the right operand associated with the "=" node 819 is dereferencing a pointer. The left child of the left "=" node 819 is therefore a "*" node 850. The dereference operation has a single operand. The operation performed to determine the operand is addition. The central child of the "*" node 850 is therefore a "+" node 852.

The left operand associated with the "+" node 852 is the pointer destinationp. The left child of the "+" node 852 is therefore a destinationp node 854. Because it represents a source operand, the latter node is a leaf node.

The right operand associated with the "+" node 852 is the number "2". The right child of the "+" node 852 is therefore a "2" node 854. Because it represents an source operand, the latter node is a leaf node.

The dot handler 424 carries out steps 615 and 616 of FIG. 6 to detect the dot token in the first example 810 and replace it with an IR node for a call to the pcoord intrinsic function. The dot handler 424 generates the second parse tree 814 from the first parse tree 812 as follows. In the second parse tree 814, the dot node 826 has been replaced by a pcoord node 858. The parameter associated with the pcoord node 858 is the number 0. The central child of the pcoord node 850 is therefore a "0" node 860. Because it represents a function parameter, the latter node is a leaf node.

The shape caster 426 carries out steps 618 and 620 of FIG. 6 to detect the combination of scalar and parallel operands in the left index of the first example 810 and promote "(1+i)" to enable it to be added to the value returned by the pcoord intrinsic function. Specifically, the shape caster 426 generates a promote operation having a left operand of "(signed int: current)" and a right operand of "(1+i)".

The shape caster 326 generates the third parse tree 816 from the second parse tree 814 as follows. The third parse tree 816 is identical to the second parse tree 814 except for the right descendants of the "+" node 824. The right child of the "+" node 824 is a promote node 862. The left child of the type cast node 862 is a "(signed int: current)" node 864. Because it represents an operand, the latter node is a leaf node. The right child of the type cast node 862 is the "+" node 828. The right and left child of the "+" node 828 are described above.

7. IR Code Generation a. Structure and Method

Figure 9:
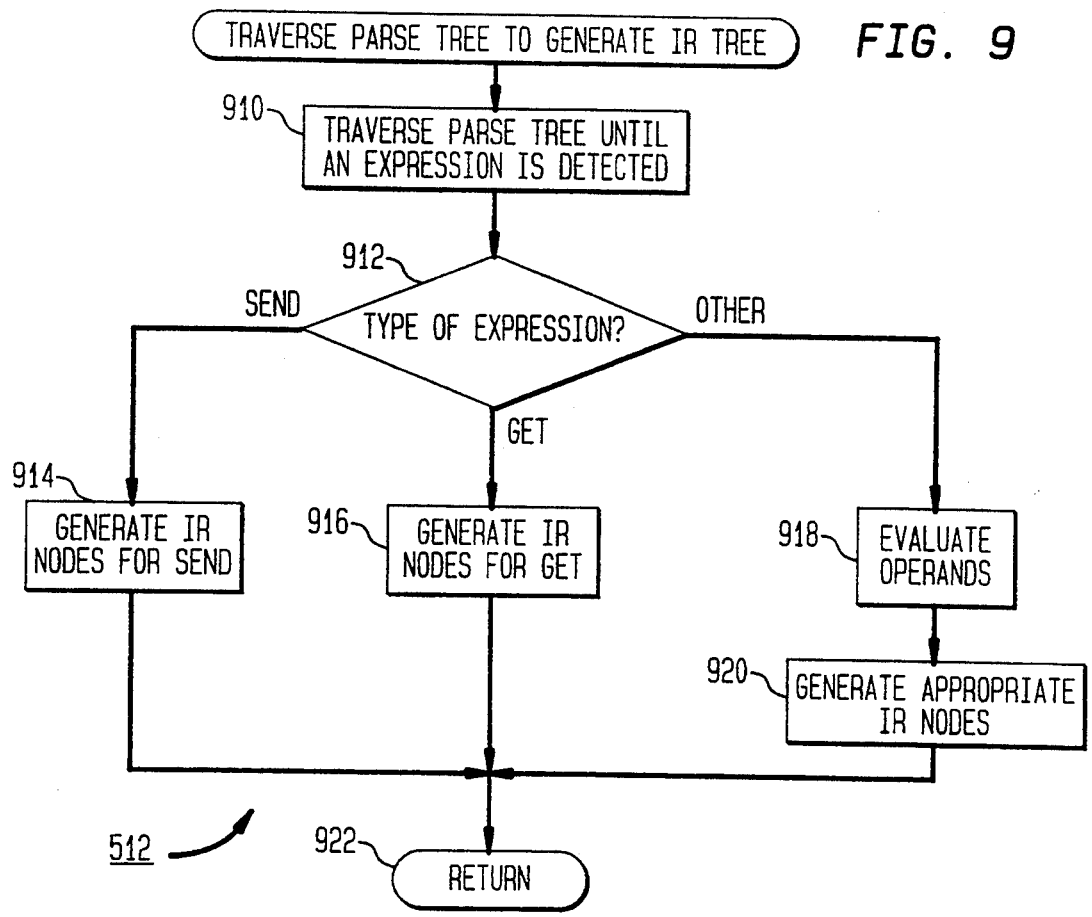
FIG. 9 is a more detailed flow chart of a step 512 of FIG. 5 of traversing the parse tree to generate an IR tree.
Figure 10:
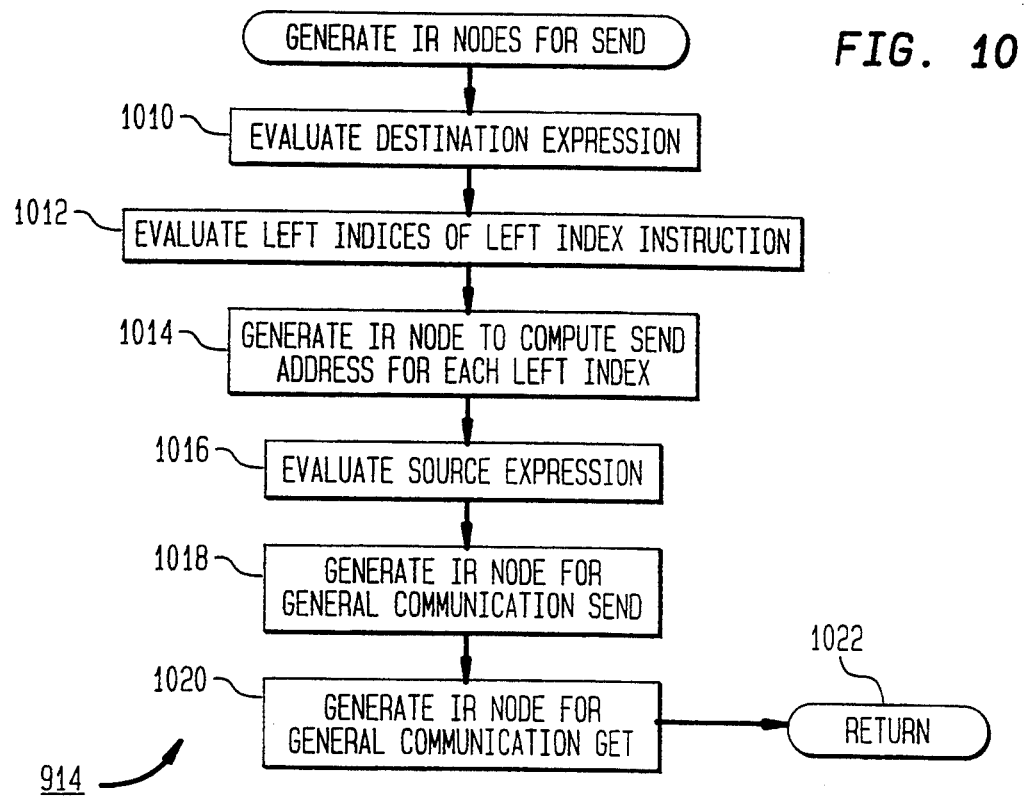
FIG. 10 is a more detailed flow chart of a step 914 of FIG. 9 of generating IR nodes for a send instruction.
Figure 11:
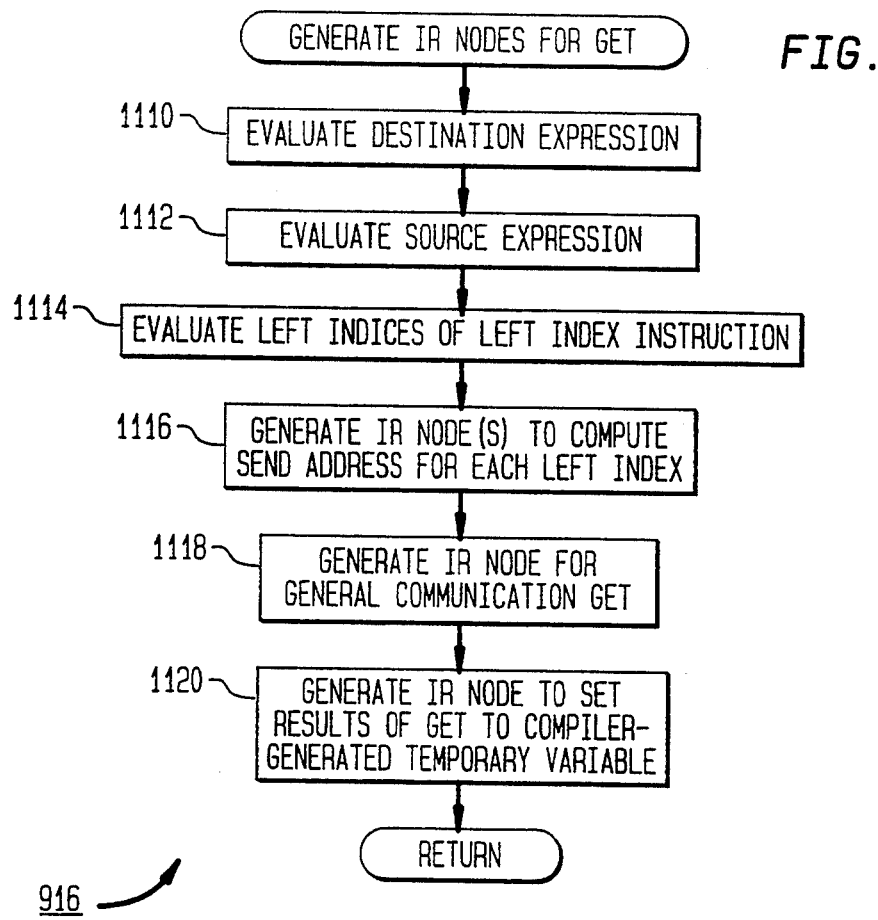
FIG. 11 is a more detailed flow chart of a step 916 of FIG. 9 of generating IR nodes for get instructions.

FIGS. 9-11 show flow charts which illustrate the details of step 516 of FIG. 5 (traversing the parse tree 318 to generate the IR tree 332).

Looking at FIG. 9, in a step 910 the middle end 312 traverses the parse tree 318 until an expression is detected. In a step 912, the middle end 312 determines the type of expression detected.

If the syntax of the expression matches a template for the send instruction, then in step 914 the middle end 312 generates the appropriate IR nodes for the send, as described in detail in FIG. 10 and the accompanying text. The template for the send instruction is a parallel left index expression which occurs on the left-hand side of an assignment.

If the syntax of the expression matches a template for the get instruction, then in step 916 the middle end 312 generates the appropriate IR nodes for the get, as described in detail in FIG. 11 and the accompanying text. The template for the get instruction is a parallel left index expression which occurs as a source operand.

If the expression is neither a send nor a get, then in step 918 the middle end 312 evaluates the operands of the expression to the extent possible at compile time. This evaluation could involve a recursive call to the step 910. Then, in a step 920, the middle end 312 generates the appropriate IR nodes for the instruction indicated by the expression.

After the step 914, 916 or 920, C* compiler 154 flow of control returns to the calling routine (the step 515 of FIG. 5), as indicated by a step 922.

FIG. 10 is a flow chart of the detailed method of processing the send instruction (step 914). In a step 1010, the middle end 312 evaluates the destination expression of the send instruction to the extent possible at compile time. The evaluation could involve a recursive call to the step 910 of FIG. 9.

In step 1012, the middle end 312 evaluates the left indices of the left index expression of the send instruction to the extent possible at compile time. This evaluation also could involve a recursive call to the step 910.

In a step 1014, the middle end 312 generates, for each left index of the send instruction, an IR node for a function of the Paris library 162 for computing a parallel value called "send_address." The operands of each IR node are the shape of the evaluated destination expression and the evaluated left index for which send_address is being computed. Each element of send_address identifies an address on one of the parallel processors 112. Accordingly, each element indicates where to send the element at the corresponding position of the evaluated source expression.

In a step 1016, the middle end 312 evaluates the source expression of the send instruction to the extent possible at compile time. Again, the evaluation may involve a recursive call to the step 910 of FIG. 9.

In a step 1018, the middle end 312 generates an IR node for a function of the Paris library 162 for carrying out the send instruction with general communication. The operands of the send IR node are the evaluated destination expression, the send_address(es) and the evaluated source expression.

In step 1020, the middle end 312 generates an IR node for a function of the Paris library 162 for carrying out the get instruction with general communication. The source operand of the get instruction is the evaluated destination expression. The send_address operand(s) of the get instruction is the same as that for the send instruction. The destination operand for the get instruction is a compiler-generated-temporary variable. The get instruction is performed to make the results of the send instruction available (through the compiler-generated temporary variable) to any other operation in which the send instruction is a source operand. C* compiler 154 flow of control then returns to the calling routine.

FIG. 11 is a flow chart of the detailed method of processing the get instruction (step 916). In a step 1110, the middle end 312 evaluates the destination expression of the get instruction to the extent possible at compile time. The evaluation could involve a recursive call to the step 910 of FIG. 9.

In a step 1112, the middle end 312 evaluates the source expression of the get instruction to the extent possible at compile time. Again, the evaluation may involve a recursive call to the step 910 of FIG. 9.

In step 1114, the middle end 312 evaluates the left indices of the send instruction to the extent possible at compile time. This evaluation also could involve a recursive call to the step 910.

In a step 1116, the middle end 312 generates, for each left index of the send instruction, an IR node for a function of the Paris library 162 for computing a send_address. The operands of each of these IR nodes are the shape of the evaluated destination expression and the evaluated left index for which the send_address is being computed.

In a step 1118, the middle end 312 generates an IR node for the function of the Paris library 162 for carrying out the get instruction with general communication. The operands of the IR node are the evaluated destination expression, the send_address(es) and the evaluated source expression.

In step 1120, the middle end 312 generates an IR node for an operation to set the results of the get instruction to a compiler-generated temporary variable. Any instruction to which the get instruction is a source operand can then access the results through the compiler-generated temporary variable. C* compiler 154 flow of control then returns to the calling routine.

b. Example

Once the C* compiler 154 has constructed the third parse tree 816 for the first example 810, the middle end 312 traverses the third parse tree 816 in order to generate the nodes of the IR tree 332. For the purposes of illustration, the IR nodes generated for the first example 810 are classified into a destination evaluation IR block, a source evaluation IR block, a send IR block and a left index evaluation IR block, a NEWS to send translation IR block, a get IR block, and a set-to-temporary IR block. These IR blocks represent the output of the steps 1110, 1112, 114, 1116, 1118 and 1120 respectively, of FIG. 11. Note that only the IR nodes generated in the step 916 of FIG. 9 are discussed here. There would be additional IR nodes generated for the first example 810, for example, to create parallel variables.

As the output of step 1110, the destination evaluation IR block consists of IR nodes to evaluate the destination expression. Specifically, the destination evaluation IR block generates code to evaluate the destination expression "*(destinationp+2)" by evaluating the subtree of the third parse tree 816 whose root is the "+" node 852.

| 1. | MULTIPLY DEST CMC_s_temp_0 |
|---|---|
|  | SOURCE1 2 |
|  | SOURCE2 32 |
| 2. | OFFSET DEST CMC_s_temp_1 |
|  | SOURCE destinationp |
|  | AMOUNT CMC_s_temp_0 |

To facilitate explanation, the IR nodes of the destination IR block (as well as the IR nodes of the other IR blocks shown) have been numbered. The source operands of the addition represented by the "+" node 852 are destinationp and 2. Adding a number to a pointer has the effect of offsetting the pointer by that number of elements. Therefore, in the first example 810, the offset is the product of two and the size of the elements pointed to by destinationp. The latter are integers, which are assumed to be represented with 32 bits.

The first IR node represents C/Paris code for calculating the amount of the offset. Specifically, the first node represents C/Paris code for multiplying a first source, 2, and a second source, 32, and storing the product in a destination temporary variable CMC_s_temp_0.

The second IR node represents C/Paris code for offsetting a source, destinationp, by the amount stored in CMC_s_temp_0. The offset value is stored in a temporary variable called CMC_s_temp_1.

As the output of step 1112, the source evaluation IR block consists of IR nodes representative of C/Paris code for evaluating the source expression. Specifically, the source evaluation IR block represents C/Paris code to evaluate the source expression "source1 * source2" by evaluating the subtree of the third parse tree 816 whose root is the "*" node 844.

The source evaluation IR block consists of the IR node:

| 3. | MULTIPLY DEST CMC_p_temp_1 |
|---|---|
|  | SOURCE1 source1 |
|  | SOURCE2 source2 |

The third IR node represents C/Paris code for multiplying a first source, source 1, and a second source, source2 and storing the product in a temporary destination variable CMC_p_temp_1 . The value of CMC_p_temp_1 is the source parallel value.

As the output of step 1114 of FIG. 11, the left index evaluation IR block consists of IR nodes representative of C/Paris code for evaluating the left index expression. Specifically, the left index evaluation IR block represents C/Paris code to evaluate the left index ".+(1+i)" of the first example 810 by evaluating tile subtree of the third parse tree 816 whose root is the "+" node 824.

The left index evaluation IR block consists of the IR nodes:

| 4. | PCOORD DEST CMC_p_temp_3 |
|---|---|
|  | AXIS 0 |
| 5. | ADD DEST CMC_s _temp_2 |
|  | SOURCE1 1 |
|  | SOURCE2 i |
| 6. | PROMOTE DEST CMC_p_temp_4 |
|  | SOURCE CMC_s_temp_2 |
| 7. | ADD DEST CMC_p_temp_5 |

| | |
|---|---|
| | SOURCE1 CMC_p_temp_3 |
| | SOURCE2 CMC_p_temp_4 |

The fourth IR node represents C/Paris code for evaluating the subtree of the third parse tree 816 whose root is the pcoord node 858. Specifically, it represents C/Paris code for calling the pcoord intrinsic function with a parameter of 0 and storing the result of the pcoord intrinsic function in a temporary parallel value called CMC_p_temp_2.

The fifth IR node represents C/Paris code for evaluating the subtree of the third parse tree 816 whose root is the "+" node 828. The evaluation is performed by adding the first operand, 1 to the second operand, i, and storing the sum in a temporary variable called CMC_s_temp_2.

The sixth and seventh IR nodes generate C/Paris code for evaluating the subtree rooted with the "+" node 824. The C/Paris code represented by the sixth IR node promotes CMC_s_temp_2 (the sum calculated by the C/Paris code represented by the fifth IR node) to a parallel value and stores the result in a temporary variable called CMC_p_temp_4.

The seventh IR node generates the C/Paris code for adding the promoted sum of "1+i" to the value returned by the pcoord intrinsic function. Specifically, the seventh IR node represents C/Paris code for adding a source CMC_p_temp_3 (the value returned by the function) to a source CMC_p_temp_4 (the promoted sum) and storing the result in a temporary variable called CMC_p_temp_5. The value of CMC_p_temp_5 is the reduced left index. The reduced left index is called a NEWS address.

As the output of step 1116, the NEWS to send IR block consists of IR nodes which represent C/Paris code for translating the NEWS address into a send_address. Specifically, the NEWS to send IR block represents C/Paris code for generating the appropriate "send_address" from the sum of the value returned by the pcoord intrinsic function and the promoted sum of 1 and i into an address which uniquely identifies the source positions indicated by the NEWS address.

The NEWS to send IR block consists of the IR node:

| 8. | DEPOSIT_NEWS_COORDINATE DEST |
|---|---|
|  | CMC_p_temp_2 |
|  | SHAPE S |
|  | SEND_ADDRESS (null) |
|  | AXIS 0 |
|  | COORDINATE CMC_p_temp_5 |

The eighth IR node represents C/Paris code for performing the NEWS-to-send translation. The first operand to the IR node is the shape of the destination parallel value, which is "S".

The second operand is the send_address for all other axes numbered lower than the axis for which the send_address is sought. Because the source parallel value of the first example 810 is of rank one, there is only one left index. The second operand is therefore null.

The third operand is an identifier of the axis for which the send_address is sought. The identifier of the first (or the only) axis of a parallel value is 0. Therefore, the third operand is 0.

The fourth operand is the NEWS address for the axis for which the send_address is sought. The NEWS address for the only left index of the first example 810 is the value calculated by the seventh IR node and stored in CMC_p_temp_5.

As the output of step 1118, the get IR block consists of an IR node representative of the C/Paris code for getting copies of data from the destination parallel value to the addresses specified by the send_address. Specifically, the get IR block represents the C/Paris code for getting copies of the elements of the parallel value "*(destinationp+2)" to positions of the parallel value "source1 * source2" which are specified by the left index "[.+(1 +i)]". The C/Paris code uses the results calculated in the steps 1110, 1112 and 1116, to evaluate the "=" node 819 of the third parse tree 816.

As the output of the step 1118, the get IR block consists of the following IR nodes:

```
9.  GET DEST CMC_p_temp_6
        SEND_ADDRESS CMC_p_temp_2
        SOURCE CMC_p_temp_1
        COLLISION_MODE 1
10. DEREFERENCE DEST CMC_s_temp_ret_val_0
        SOURCE CMC_s_temp_1
11. ASSIGN DEST CMC_p_temp_ret_val_0
        SOURCE CMC_p_temp_6
```

The ninth IR node represents the C/Paris code for carrying out the get. The first operand to the IR node is the send_address for the left index which corresponds to the axis on which tile get is to be performed. The send_address for the sole left index of the first example 810 was calculated by the eighth IR node. The first operand is therefore CMC_p_temp_2, the destination of the eighth IR node.

The second operand is the source, i.e., the destination parallel value calculated by the third IR node. The second operand is therefore CMC_p_temp_1, the destination of the eighth IR node.

The third operand specifies how get collisions are handled. A get collision occurs when send_address two or more send_address elements are the same. The collision mode of 1 specifies that collisions are allowed to occur.

The destination of the ninth IR node is a temporary variable called CMC_p_temp_6.

The tenth IR node represents C/Paris source code for evaluating the subtree of thee third parse tree 816 whose root is the "*" node 838 so as to dereference the pointer to tile destination parallel value. Specifically, the tenth IR node represents C/Paris code for dereferencing a source, CMC_s_temp_1 (the result associated with the second IR node), and storing the dereferenced value in a temporary variable called CMC_s_temp_ret_val_0.

The eleventh IR node represents C/Paris code for assigning the result of the get to the value dereferenced by the C/Paris code represented by the tenth IR node. Specifically, the eleventh IR node assigns the value of CMC_p_temp_6 to CMC_p_temp_ret_val_0. Note that CMC_p_temp_6 is the destination operand of the ninth node, and CMC_p_temp_rat_val_0 is the destination operand of the tenth node.

As the output of the step 1130, the set-to-temporary IR block consists of the following node.

```
12. DEREFERENCE DEST CMC_p_temp_ret_val_1
        SOURCE CMC_s_temp_1
```

The twelfth IR node, like the tenth IR node, generates C/Paris code for dereferencing the result associated with the second IR node. Specifically, the twelfth IR node generates C/Paris code for dereferencing CMC_s_temp_0 and storing the result in a temporary variable called CMC_p_temp_ret_val_1. The results of the get instruction would thereby be available to any other instruction through CMC_p_temp_ret_val_1.

IR tree generation for the send instruction is similar to that for the above-described get instruction. For example, the IR nodes generated for an example send instruction

[.+(1+i)]*(destinationp+2)=source1 * source2 are as follows:

```
MULTIPLY DEST CMC_s_temp_0
    SOURCE1 2
    SOURCE2 32
OFFSET DEST CMC_s_temp_1
    SOURCE destinationp
    AMOUNT CMC_s_temp_0
DEREFERENCE DEST CMC_s_temp_ret_val_0
    SOURCE CMC_s_temp_1
PCOORD DEST CMC_p_temp_2
    AXIS 0
ADD DEST CMC_s_temp_2
    SOURCE1 1
    SOURCE2 i
PROMOTE DEST CMC_p_temp_3
    SOURCE CMC_s_temp_2
ADD DEST CMC_p_temp_4
    SOURCE1 CMC_p_temp_2
    SOURCE2 CMC_p_temp_3
DEPOSIT_NEWS_COORDINATE DEST CMC_p_temp_1
    SHAPE S
    SEND_ADDRESS (null)
    AXIS 0
    COORDINATE CMC_p_temp_4
MULTIPLY DEST CMC_p_temp_5
    SOURCE1 source1
    SOURCE2 source2
SEND DEST CMC_p_temp_ret_val_0
    SEND ADDRESS CMC_p_temp_1
    SOURCE CMC_p_temp_5
    COMBINER 0
    NOTIFY (null)
GET DEST CMC_p_temp_6
    SEND ADDRESS CMC_p_temp_1
    SOURCE CMC_p_temp_ret_val_0
    COLLISION_MODE 1
```

5. Parallel Communication Instruction Optimization a. Overview of Efficient Parallel Communication The middle end 312 generates IR nodes for canning out parallel communication instructions with general communication. If the data parallel computer 110 on which the target code will execute is capable of performing grid communication or of emulating grid communication, then the optimization described in FIGS. 12-15 and the accompanying text is performed. This optimization involves replacing the above IR nodes with IR nodes for canning out parallel communication with grid communication when doing so is possible and would result in more efficient target code.

In the C/Paris code, the parallel communication instructions are represented by calls to functions in the C* library 160 or the Paris library 162. At run time, these functions invoke the Paris instruction set 164.

Two such functions, called news_or_send and news_or_get are in the C* library 160. These functions determine whether grid communication is possible and, if so, whether it would be more efficient than general communication for a particular instruction in a particular program. If grid communication is possible and would be more efficient than general communication, the functions carry out the specified parallel communication instruction via grid communication. Otherwise, they carry out the specified instruction via general communication.

If the determination as to whether grid communication or general communication should be used can be made at compile time, the associated program will run faster. If it is determined at compile time that grid communication should be used, the C* library 160 functions called "to_torus" and "from_torus" can be used. These functions perform the specified parallel communication instruction via grid communication with a shift of a specified offset along a specified axis. The Paris instruction set 164 can only be invoked to carry out grid communication with an offset which is a power of two. The functions to_torus and from_torus therefore carry out the specified communication by decomposing the offsets into one or more power-of-two offsets (called offset elements) and invoking the Paris instructions set 164 for each offset element.

A run time system need not be called to calculate the offset elements if they are calculated at compile time. Accordingly, to speed execution of get instructions in which the offset is a constant, the C* compiler 154 calculates the offset elements at compile time and, for each offset element, generates a call to a function in the Paris library 162 called get_from_power_two. This function carries out parallel communication for the specified power-of-two offset in a specified dimension and along a specified axis. This function, as well as other functions in the Paris library 162 are described in greater detail in the above-cited document entitled *Paris Reference Manual* for Version 6.0 of Paris.

Grid communication among nearest neighbor parallel processors 112 whose grid location differs by one is faster than grid communication among other nearest-neighbor parallel processors 112. Therefore, the Paris library 162 includes functions called get_from_news and send_to_news. These functions carry out the specified parallel communication instruction with an offset of 1 or −1 in a specified dimension.

b. Structure and Method

Figure 12:
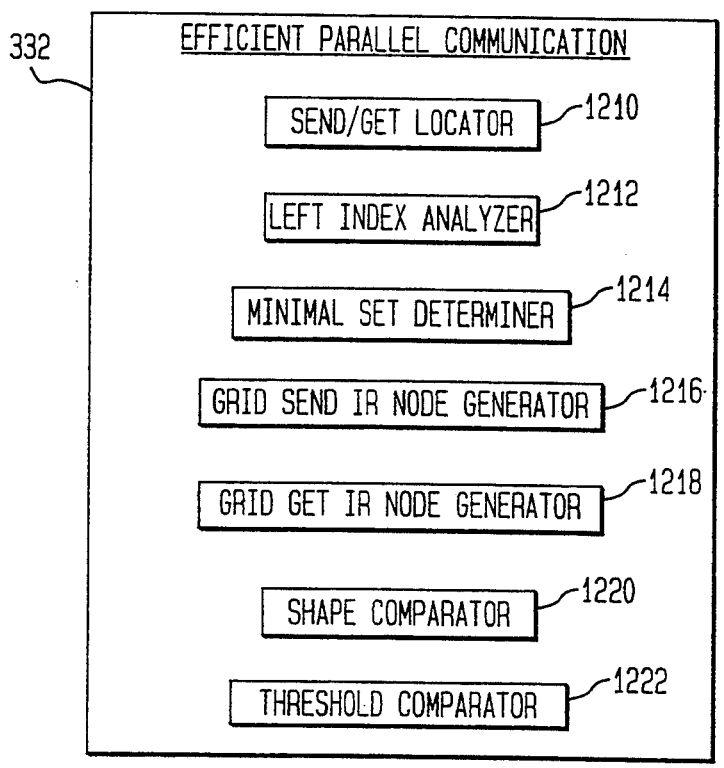
FIG. 12 is a more detailed block diagram of an efficient parallel communication module of FIG. 3.

FIG. 12 shows a more detailed block diagram of the structure of the efficient parallel communication module 338 of FIG. 3. The efficient parallel communication module 338 comprises a send/get locator 1210, a left index analyzer 1212, a minimal set determiner 1214, a grid send code generator 1216, a grid get code generator 1218, a shape comparator 1220 and a threshold comparator 1222.

Figure 13A:
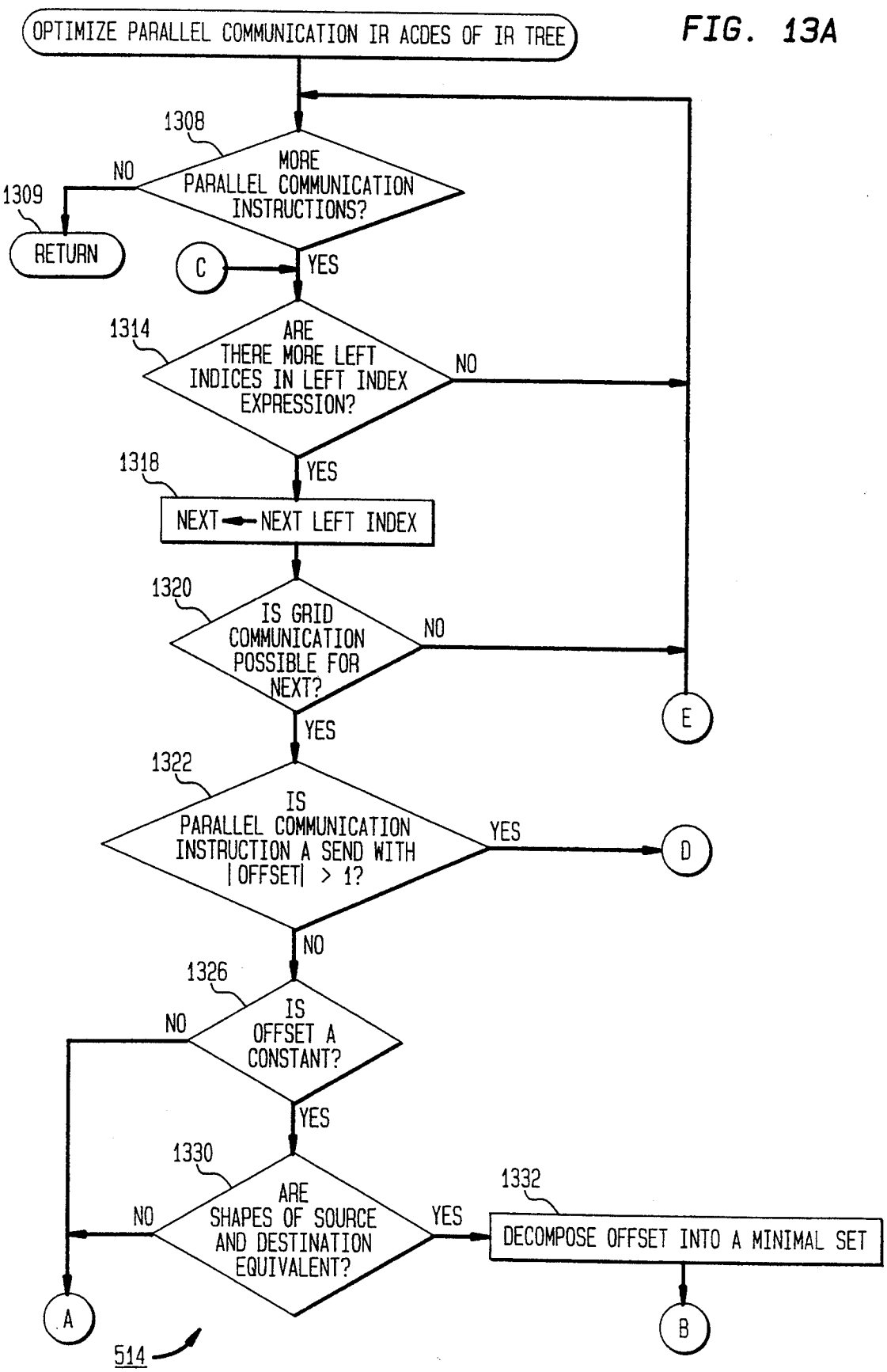
FIGS. 13A and 13B are a more detailed flow chart of a step 514 of FIG. 5 of optimizing the parallel communication IR nodes of the IR tree.
Figure 13B:
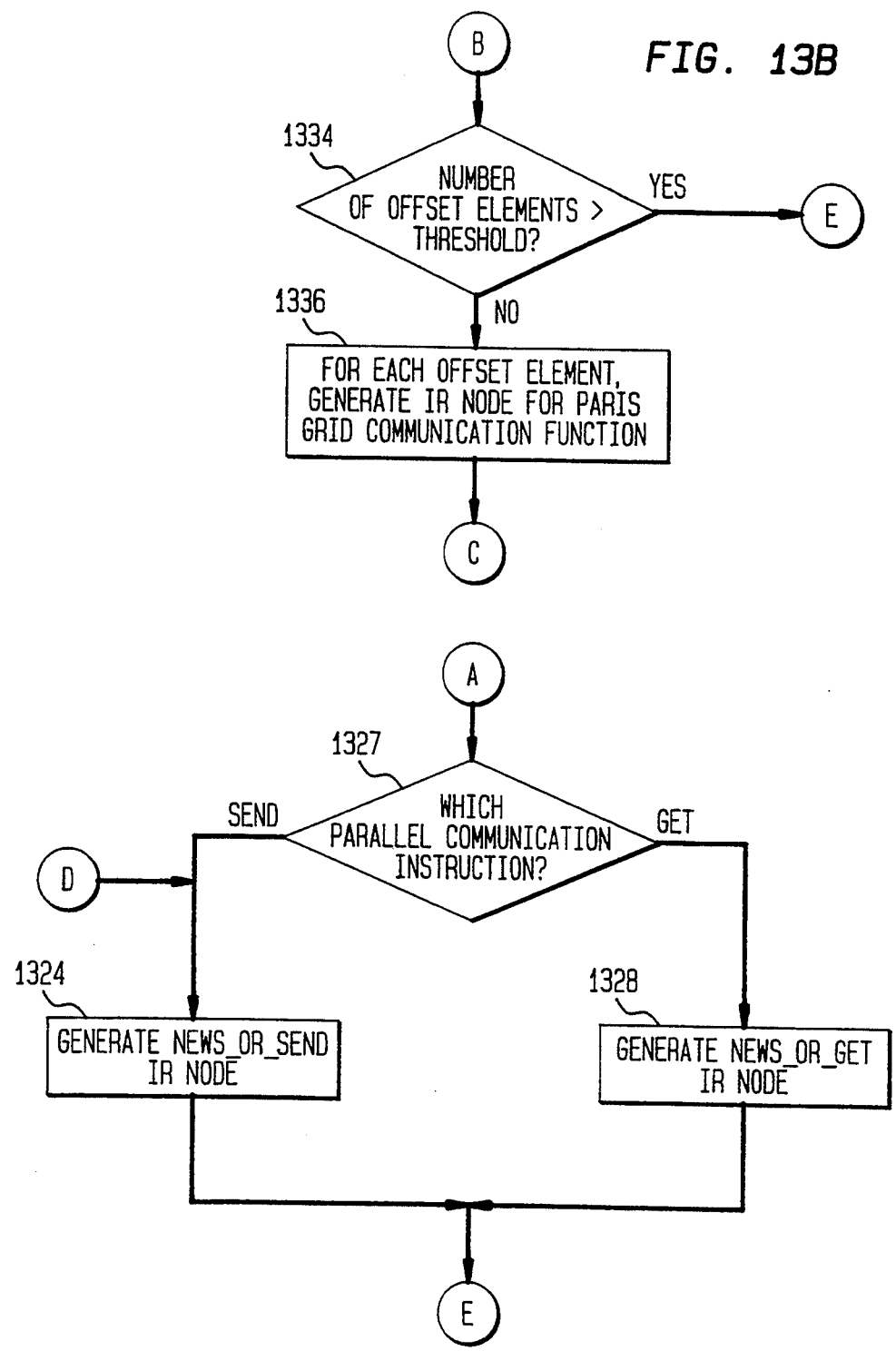

FIGS. 13A and 13B show a flowchart of the interaction between the submodules of the efficient parallel communication module 338. The flowchart of FIGS. 13A and 13B also shows the detailed method of the step 312 of FIG. 4.

Looking at FIG. 13A, in a step 1308 the send/get locator 1210 determines whether there are any parallel communication instructions in the IR tree 332 which have not yet been processed. If not, then C* compiler 154 flow of control returns to the calling step (414 of FIG. 4), as indicated by the step 1309.

If there is an additional parallel communication instruction to be processed, then in step 1314, the left index analyzer 1212 determines whether there are additional left indices in the left index expression of the parallel communication instruction to process. A negative determination indicates that grid communication IR nodes were generated for the parallel communication instruction. There could be a step to delete the associated general communication IR nodes replaced by the grid communication IR nodes. Alternatively, the optimizer 313 could employ conventional optimization techniques to recognize that the results of the general communication instructions are no longer used and delete the associated IR nodes. In a step 1316, C* compiler 154 flow of control returns to the step 1308.

If, on the other hand, there are additional left indices to process, then in a step 1318 a temporary variable called "next" is set to point to the next left index of the left index expression. In a step 1320, the left index analyzer 1212 determines whether "next" is of a form which indicates that grid communication is possible. As stated, grid communication is not possible unless, among other conditions, there is a single offset between each of the source positions and the corresponding destination positions. This condition is assured to be met for a left index of the form:

[(./pcoord(left_index_identifier){±scalar_int_expression}){%%
dimof(current_shape,left_index_identifier)}]

In the representation above, expressions written immediately to the left and right of a "/" are alternatives. Expressions within braces are optional.

If the left index consisted only of a dot token or a call to the pcoord intrinsic function with a parameter identifying the left index, then the offset would be zero. Grid communication would therefore be possible.

Grid communication would also be possible if the left index further include instructions to add to or subtract from the results of the dot token or pcoord intrinsic function a scalar integer expression (represented by "±scalar_int_expression"). If such instructions were included, the result of the addition or subtraction would specify one offset between each of the source positions and the corresponding destination positions.

Grid communication would further be possible if the left index further included instructions to determine the above sum or difference modulo the number of positions in the dimension addressed by the left index currently being processed (represented by "%% dimof(current_shape, left_index_identifier)"}]. The "dimof" function returns the number of positions in the specified dimension of the specified parallel variable (or shape). Because the data parallel computer 110 provides for toroidal communication between the parallel processors 112, the results of the modulo would specify one offset between each of the source positions and the corresponding destination positions.

If "next" were not of a form which indicates that grid communication is possible, then the general communication IR nodes are not replaced by grid communication IR nodes. Grid communication IR nodes may have been generated for previous left indices of the parallel communication instruction being processed. There could be a step to delete the grid communication IR nodes. Alternatively, the optimizer 313 could employ conventional optimization techniques to recognize that the results of the general communication instructions are no longer used and delete the grid communication IR nodes. Or, such IR nodes could be avoided if the determination of the step 1320 were made for all left indices before further generating IR nodes for any left index. C* compiler 154 flow of control then returns to the step 1308.

If, on the other hand, "next" is of a form which indicates that grid communication is possible, then in a step 1322, the send/get locator 1210 determines whether the parallel communication instruction is a send instruction with an offset whose absolute value is greater than one. If so, then in a step 1324 the grid send IR node generator 1216 generates a call to the news_or_send function of the C* library 160. The steps 1322 and 1324 are necessary because the Paris library 162 lacks a function for the send instruction equivalent to the get_from_power_two function (discussed above) for the get instruction.

As discussed with regard to the step 1316, there could then be a step to delete any grid communication IR nodes which may have been generated for previous left indices. Alternatively, such instructions could be deleted by the submodule of the optimizer 318 which deletes instructions it determines to be nowhere used. C* compiler 154 flow of control then returns to the step 1308.

If the determination of step 1322 was negative, then in a step 1326 the left index analyzer 1212 determines whether the offset of "next" is a constant. If the offset is not a constant, then it cannot be determined at compile time whether replacing the general communication instructions with grid communication instructions would cause the parallel communication instruction to execute faster. The replacement may not result in increased performance if the offset could not be decomposed into a small number of power-of-two offsets. The number of power-of-two offsets at which grid communication becomes slower than general communication is hardware dependent. This number is called the threshold. If the threshold is quite high, it may be desirable to bypass the step 1326.

If the step 1326 was not bypassed and the offset was not a constant, then the determination of whether or not to carry out the parallel communication operation by general communication or grid communication is postponed until run time. Accordingly, in a step 1327 the send/get locator 1210 determines whether the parallel communication instruction was a send instruction or a get instruction. If it was a send instruction, then C* compiler 154 flow of control goes to the step 1324, which is explained above. If, on the other hand, the instruction was a get instruction, then in a step 1328 the grid get IR node generator 1218 generates a call to the news_or_get function of the C* library 160 (described above). C* compiler 154 flow of control then returns to the step 1308 which is explained above.

But if the offset of "next" is a constant or if the step 1326 was bypassed, then in a step 1330 the shape comparator 1220 determines whether the shapes of the source parallel value and the destination parallel value are equivalent as follows.

First, comparison shapes of the source and destination are determined. The comparison shape of the source (if the parallel communication instruction is a send) or the destination (if the parallel communication instruction is a get) is the shape which was current at the point of the program where the parallel communication instruction occurred. The comparison shape of the destination (for a send) or the source (for a get) is the shape which the variable was cast to be or declared to be.

Second, the comparison shapes are compared for equivalence. The method for determining shape equivalence is described in more detail in the pending U.S. patent application Ser. No. 07/788,003, filed Nov. 5, 1991, entitled *System and Method for Parallel Variable Optimization*, now pending. This document is hereby incorporated by reference as if set forth in full below. A high-level description of the method follows. The comparison shapes are deemed equivalent if their names are the same. The comparison shapes are also deemed equivalent if one was assigned to the other in the program. Note that for such an assignment, the two shapes should have the same configuration, that is, the same number of dimensions and the same number of elements in each dimension.

If shapes of the source and destination parallel values are deemed not to be equivalent, C* compiler 154 flow of control goes to the step 1327, which is explained above.

If the shapes of the source and destination parallel values are deemed equivalent, and if the step 1326 was eliminated, then the grid get IR node generator 518 generates an IR node for a call to the from_torus function. The function is part of the C* library 160 and is described above in the section entitled "Overview of Efficient Parallel Communication".

If the step 1326 was not bypassed, then in a step 1332 the minimal set determiner 1214 decomposes the offset so as to generate a minimal set. The offset elements of the minimal set are the offsets for the least number of steps necessary to effect the grid communication. Accordingly, the absolute value of each offset element is a power of two, and the sum of the offset elements is the offset of the parallel communication operation. The method by which the minimal set determiner 1214 performs the decomposition is described in more detail in FIGS. 14A, 14B, 15A and 15B and the accompanying text.

Next, in a step 1334 on FIG. 13B, the threshold comparator 1222 compares the number of offset elements in the minimal set to the threshold value. As with the step 1326, if the threshold for the data parallel computer 110 on which the parallel communication instruction will be carried out is high, the step 1334 may be bypassed. If the step 1334 is not bypassed and if the number of paths exceeds the threshold, then C* compiler 154 flow of control returns to the step 1308, which is explained above.

Figure 16:
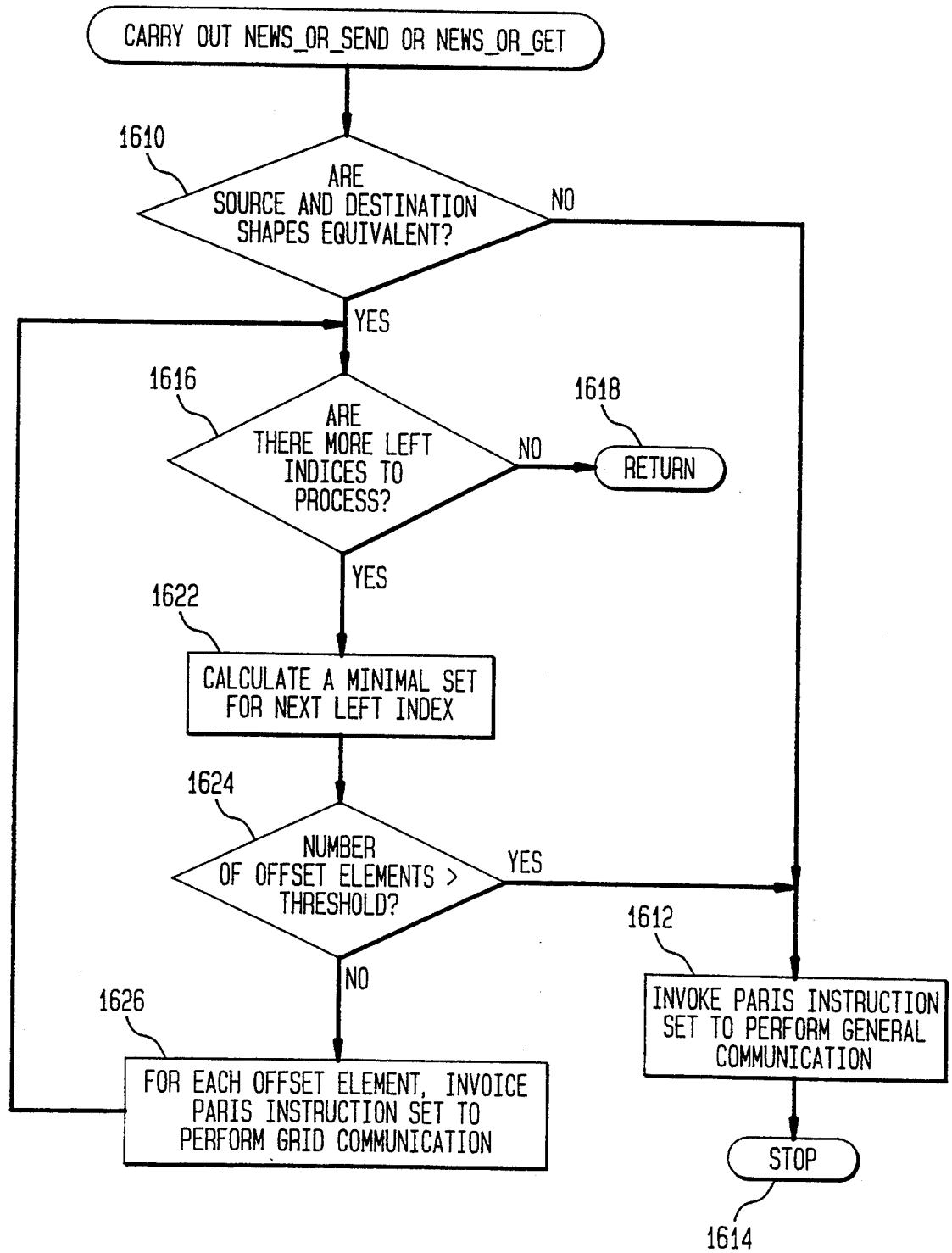
FIG. 16 shows a flow chart of the method of a news_or_send or a news_or_get function of the C* library of FIG. 1.

Otherwise, in a step 1336, the grid IR node get node generator 1218 generates, for each offset element in the minimal set, an IR mode for the appropriate Paris grid communication function. FIG. 16 and the accompanying text describe the method of carrying out the step 1336 in greater detail. C* compiler 154 flow of control then goes to the step 1314, which is explained above.

c. Example

The efficient parallel communication module 338, as well as other components of the IR tree optimizer 313, optimize the IR nodes of the first example 10 to generate the following optimized IR nodes.

```
13   LEFT_SHIFT DEST CMC_s_temp_0
        SOURCE1 32
        SOURCE2 1
14   OFFSET DEST CMC_s_temp_1
        SOURCE destinationp
        AMOUNT CMC_s_temp_0
15   MULTIPLY DEST CMC_p_temp_1
        SOURCE1 source1
        SOURCE2 source2
16   ADD DEST CMC_s_temp_0
        SOURCE1 1
        SOURCE2 i
17   FROM_TORUS_DIM DEST CMC_s_temp_1
        SOURCE CMC_p_temp_1
        AXIS 0
        DISTANCE CMC_s_temp_0
```

Conventional optimization replaces the multiplication of the first IR node with the thirteenth IR node. The latter node specifies a left shift of 32 by 1 bit, the result of which is equivalent to multiplying 32 and 2. Specifically, the thirteenth node left-shifts the binary representation of a first source, 32, by the number of bits specified by a second source, 1, and stores the result in a destination temporary variable CMC_s_temp_0.

The fourteenth IR node is the same as the second (unoptimized) IR node. The fifteenth IR node is the same as the third (unoptimized) IR node. The sixteenth IR node is the same as the fifth (unoptimized) IR node except that the temporary variable CMC_s_temp_0 is re-used for the destination, as its previously determined value (the product of 32 and 2) is used only for the offset operation of the fourteenth node. The reuse of temporary parallel variables is described in greater detail in the above-referenced U.S. Patent Application entitled "System and Method for Parallel Variable Optimization".

In carrying out step 512 (determining whether the get operation of the first example 810 can be effected with grid communication), the IR tree optimizer 512 of FIG. 5 analyzes the left index ".+(i+1)". This left index is of the form $$[(./\text{pcoord}(\text{left\_index\_identifier})\{\pm\text{scalar\_int\_expression}\})\{\%\% \text{dimof}(\text{current\_shape}, \text{left\_index\_identifier})\}]$$

Accordingly, the get left index analyzer 1212 of FIG. 12 recognizes that grid communication is possible.

The efficient parallel communication module 338 which optimized the first example 810 did not include the step 1326 of FIG. 13A. Therefore, the seventeenth IR node is generated to call the from_torus function of the Paris library 162. At run time, the function performs the decomposition and carries out the get with grid communication.

The first operand to the seventeenth IR node is a pointer to the source parallel value. The pointer is the product calculated by the fifteenth IR node. The first operand is therefore CMC_p_temp_1, the destination of the fifteenth IR node. The second operand specifies the axis in which the send is to be performed. In the first example 810, the shape of the destination parallel value has only a 0 dimension. Therefore, the second operand is 0. The third operand is the distance between the processors on which the source positions reside and the processors on which the destination positions reside. The third operand is therefore CMC_s_temp_0, the scalar integer calculated by the sixteenth IR node. The destination operand is CMC_s_temp_1, the destination parallel value calculated by the fourteenth IR node.

The seventeenth IR node replaces the eighth, ninth, tenth and eleventh (unoptimized) IR nodes. Therefore, the IR tree optimizer 313 deletes these nodes.

In the first example 810, the results of the get did not occur as source operands in any other operation. Therefore, the IR tree optimizer 313 deletes the twelfth IR node.

IR tree optimization node generation for the send instruction is similar to that for the above-described get instruction. For example, the IR nodes of the optimized IR tree generated for the example send instruction $$[.+(1+i)]*(\text{destinationp}+2)=\text{source1} * \text{source2}$$

are as follows:

```
LEFT_SHIFT DEST CMC_s_temp_0
    SOURCE1 32
    SOURCE2 1
OFFSET DEST CMC_s_temp_1
    SOURCE destinationp
    AMOUNT CMC_s_temp_0
ADD DEST CMC_s_temp_0
    SOURCE1 1
    SOURCE2 i
MULTIPLY DEST CMC_p_temp_5
    SOURCE1 source1
    SOURCE2 source2
NEWS_OR_SEND DEST CMC_s_temp_1
    SOURCE CMC_p_temp_5
    AXES 1
    DISTANCES CMC_s_temp_0
    DIMENSIONS 0 0
    RUNTIME 1
```

6. Decomposition of Offsets into Grid Communication Steps

FIGS. 14A, 14B, 15A, and 15B show flowcharts for two detailed methods of carrying out step 1332 of FIG. 13A (decomposing an offset into a minimal set of powers-of-two). The flow charts of FIGS. 14A, 14B, 15A and 15B thus also depict the operation of the minimal set determiner 1214 of FIG. 12.

Figure 14A:
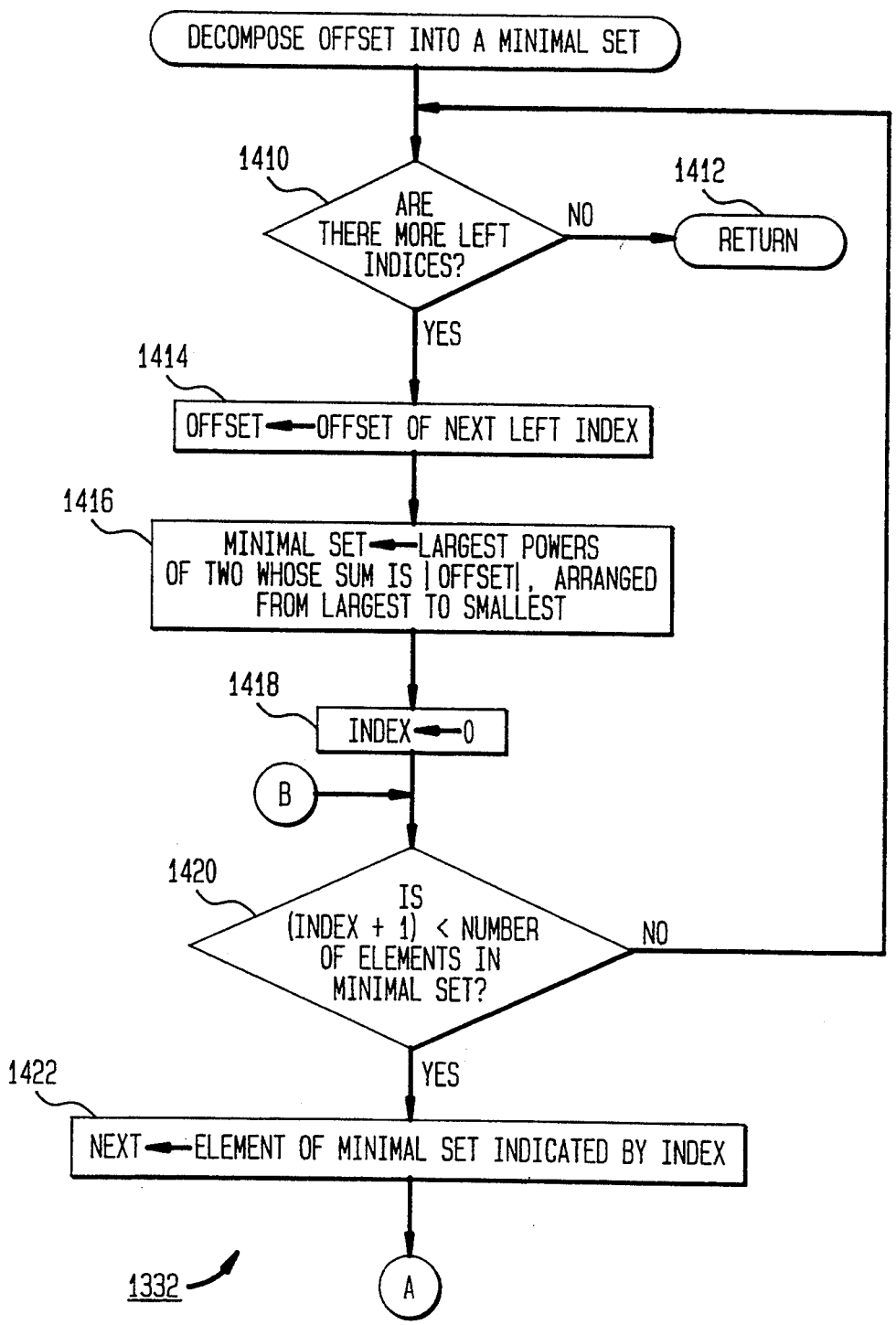
FIGS. 14A and 14B are a more detailed flow chart of one method of carrying out a step 1332 of FIG. 13A of decomposing an offset into a minimal set.
Figure 14B:
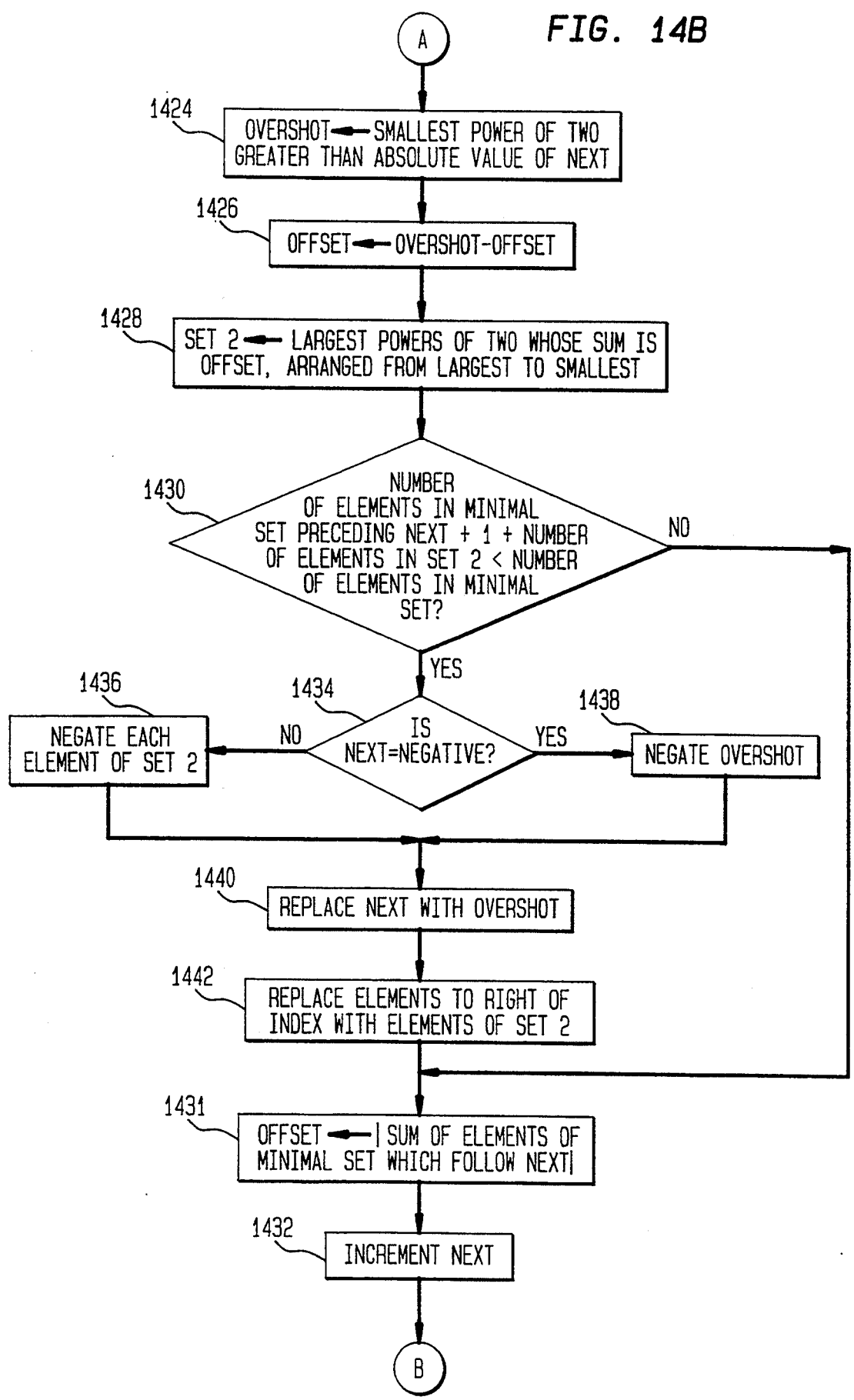

The method of FIGS. 14A and 14B is essentially as follows. A set called "minimal_set" is generated. The minimal_set contains the largest offset elements whose total distance is the length of the offset and whose direction is the same as that of the offset. As explained above, the distance of an offset element must be a power of two. The direction of an offset elements is indicated by its sign (positive or negative).

All but the last offset element in the minimal_set are selected as "next" and processed as follows. First, a second set (called "set2") is generated. The first offset element of set2 is the offset element greater having the smallest distance greater than the distance of "next" and having the same direction as that of "next". The remaining offset elements of set2 are such that their direction is the opposite of that of "next" and their total distance is the difference between the distance of "next" and the distance of the offset. Second, the number of offset elements in set2 is compared to the number of offset elements in a subset of minimal_set consisting of "next" and the offset elements following it in minimal_set. If the former number is smaller than the latter, the subset of minimal_set is replaced with the offset elements of set2.

Looking at FIG. 14A, in a step 1410 the minimal set determiner 1214 determines whether there are more left indices to process. If not, then in a step 1412, C* compiler 154 flow of control returns to the calling routine (the step 1332 of FIG. 13A). Otherwise, in a step 1414 a temporary variable called offset is set to the offset of the next left index. In a step 1416, a temporary variable called minimal_set is set to the largest powers-of-two whose sum is the absolute value of offset, arranged in descending order. Note that the offset elements of minimal_set are the powers of two represented by the 1-bits of a binary representation of the value of offset.

In a step 1418, a temporary variable called index is set to 0. In a step 1420, the minimal set determiner 1214 determines whether (index+1) is less than the number of offset elements in minimal_set. The purpose of the step 1418 is to determine whether there are any more offset elements left to process. If not, C* compiler 154 flow of control returns to the step 1410, which is explained above.

Otherwise, in a step 1422, a temporary variable called "next" is set to the offset element of minimal set indicated by index. Looking at FIG. 14B, in a step 1424, a temporary variable called overshot is set to the smallest power of two greater than the absolute value of "next". In a step 1426, offset is set to overshot minus offset. In a step 1428, a temporary variable called set2 is set to the largest powers of two whose sum is the value of offset, arranged in descending order. As with step 1416, the offset elements of set2 are the powers of two represented by the 1-bits of a binary representation of the value of offset.

In a step 1430, the minimal set determiner 1214 determines whether the number of offset elements in minimal_set exceeds the sum of: (1) the number of offset elements in minimal_set which precede the offset element indicated by "next", (2) 1, and (3) the number of offset elements in set2. If not, then in a step 1431, offset is set to the absolute value of the sum of the offset elements of minimal_set which follow "next". Next, in a step 1432, the index is incremented. C* compiler 154 flow of control then returns to the step 1420 of FIG. 14A, which is discussed above.

If, on the other hand, the determination of the step 1430 was "yes", then in a step 1434 the minimal set determiner 1214 determines whether the value of "next" is negative. If not, then in a step 1436, each offset element of set 2 is negated. If the value of "next" is negative, then in a step 1438, the value of overshot is negated.

After carrying out the step 1436 or the step 1438, then in a step 1440 the offset element of minimal_set indicated by index is replaced with the value of overshot. In a step 1442, the offset elements of minimal_set which follow the offset element indicated by index are replaced with the offset elements of set2. C* compiler 154 flow of control then goes to the step 1431, which is explained above.

Figure 15A:
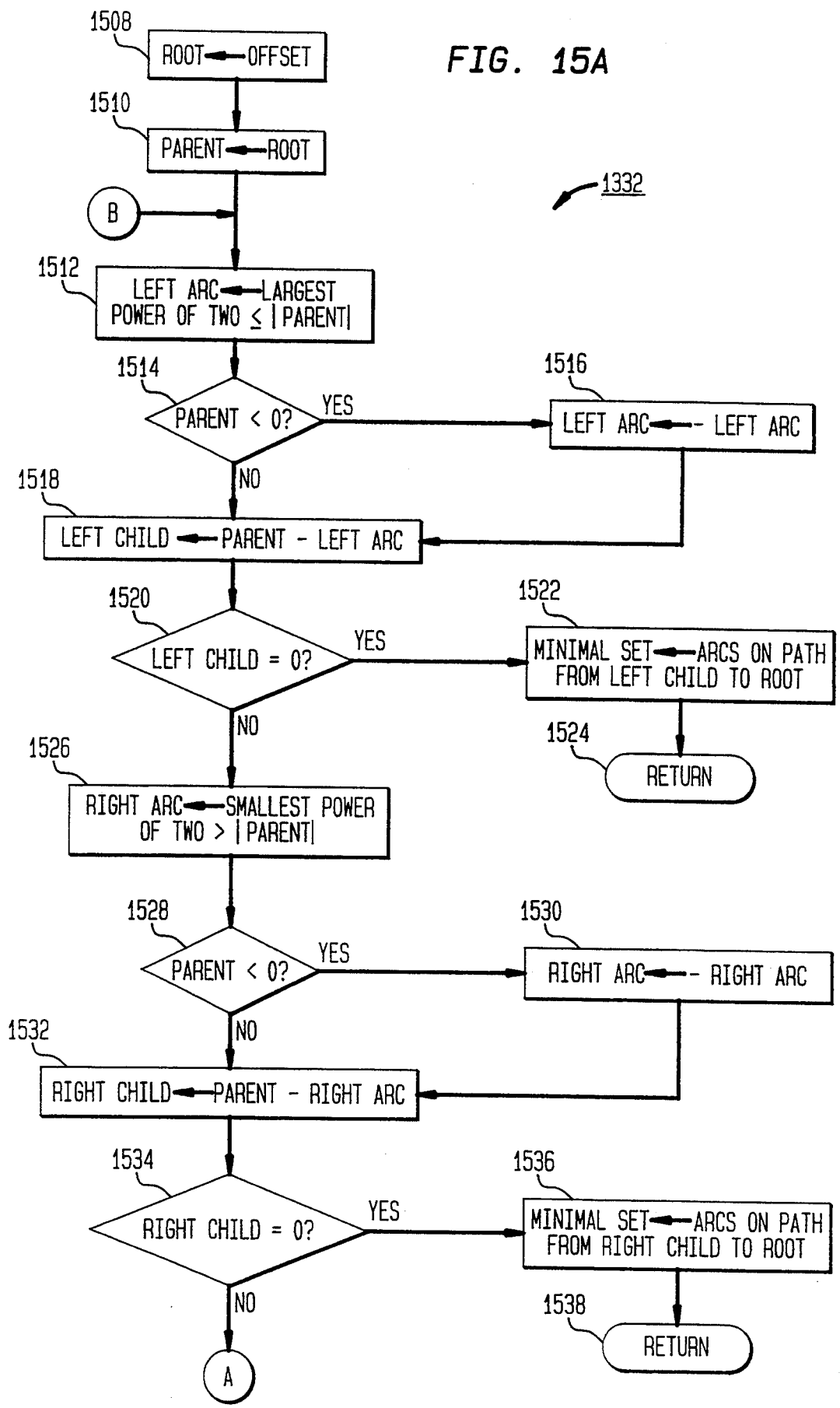
FIGS. 15A and 15B are a more detailed flow chart of a second method of carrying out a step 1332 of FIG. 13A of decomposing the offset into the minimal set.
Figure 15B:
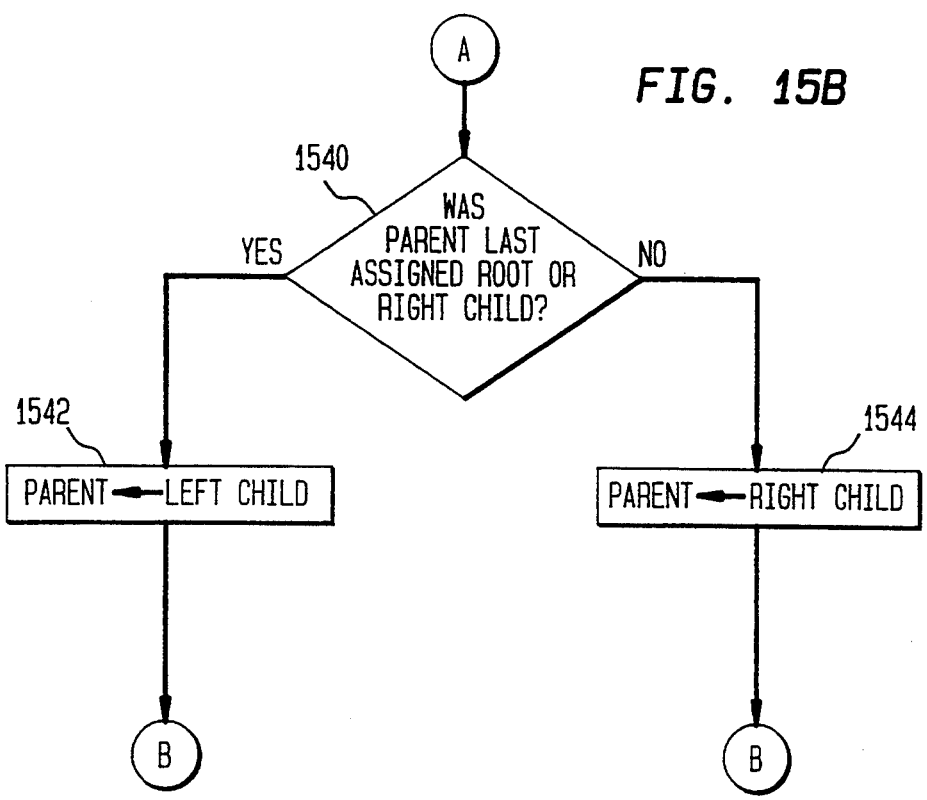

FIGS. 15A and 15B are a flow chart of an alternative method of calculating the minimal set. The alternate method employs a binary tree. The root of the tree contains the offset. The tree is constructed in a breadth-first manner. In the tree, an arc between a parent and its left child (called a left arc) is assigned the greatest power-of-two value which is not greater than the value of the parent. The left child is assigned the value of the parent minus the value assigned to the left arc. If the value of the parent is negative, then the value of the left arc is negated.

An arc between a parent and its right child (called a right arc) is assigned the smallest power-of-two value which is greater than the absolute value of the value of the parent. The right child is assigned the value of the parent minus the value of the right arc. If the value of the parent was negative, the value of the right arc is negated. The value assigned to the left and right arcs then are the power-of-two values which bracket the parent connected thereto.

The binary tree is expanded downwardly, using each child as a new parent, until a child is assigned the value zero. The minimal set is then determined by reading the values on the arcs in the path from that child to the root. The tree can be stored in a simple array.

Looking at FIG. 15A, in a step 1508, the root is set the value of the offset. In a step 1510, the parent is set to point to the root.

In step 1512, a left arc is created for the node pointed to by parent, and it receives a value set to the largest power-of-two value that is not greater than the value of the node pointed to by the parent pointer. In step 1514, the value of the node pointed to by the parent pointer is compared to zero. If the value of the node pointed to by the parent pointer is less than zero, then in a step 1516 the value of the left arc is negated. Otherwise, or after the step 1516, in a step 1518 the value of the left child is set to the value of the node pointed to by the parent pointer minus the value of the left arc.

In a step 1520, the value of the left child is compared to zero. If the value of the left child is zero, then in a step 1522 the minimal set is set to the values on the arcs on the path from the left child to the root. C* compiler 154 flow of control then returns to the calling routine, as indicated by the step 1524.

If, on the other hand, the left child is not equal to zero, then in a step 1526 a right are is created for the node pointed to by parent, and it receives a value set to the smallest power-of-two value that is not less than the value of the node pointed to by the parent pointer. In a step 1528, the value of the node pointed to by the parent is compared to zero. If the value of the node pointed to by the parent is less than zero, then in a step 1530 the value of the right arc is negated. Otherwise, or after the step 1530, in a step 1532 the value of the right child is set to the value of the node pointed to by the parent pointer minus the value of the right arc.

In a step 1534, the value of the right child is compared to zero. If the value is less than zero, then in a step 1536 the minimal set is set to the values on the arcs on the path from the right child to the root. C* compiler 154 flow of control then returns to the calling routine, as indicated by a step 1538.

If, on the other hand, right child is not equal to zero, then in a step 1540 (on FIG. 15B) it is determined whether the last assignment to the parent was either the offset or the right child. If so, then in a step 1542 the parent is set to the left child. Otherwise, in a step 1544 the parent is set to the right child. After the execution of the step 1542 or the step 1544, C* compiler 154 flow of control returns to the step 1512, which is explained above.

The purpose of the steps 1540, 1542 and 1544 is to ensure that expansion of the binary tree is breadth-first. Accordingly, evenly other time the step 1540 is executed (beginning with the first time) the binary tree is expanded to the left. Correspondingly, every other time the step 1540 is executed (beginning with the second time) the binary tree is expanded to the right.

7. Operation of News_or_Send and News_or_Get Routines

FIG. 16 is a flow chart of the method of the news_or_send function and the news_or_get function. If a news_or_send or news_or_get IR node was generated by the grid send IR node generator 1216 or the grid get IR node generator 1218 of FIG. 12 (see steps 1324 and 1328 of FIG. 13B), then at run time the data parallel computer 110 carries out the news_or_send or news_or_get. When running the news_or_send function, the data parallel computer 110 carries out a send via grid communication if the host computer 146 determines that doing so would be possible and efficient, and by general communication otherwise. When running the news_or_get function, the data parallel computer 110 performs a get via grid communication if the host computer 146 determines that doing so would be both possible and efficient, and by general communication otherwise. Both of these functions are in the C* library 160.

Looking at FIG. 16, in a step 1610, the shape of the source parallel value and the destination parallel value of a parallel communication instruction are compared.

If the shapes are not equal then grid communication is not used. Therefore, in a step 1612 the Paris instruction set 164 is invoked to carry out the parallel communication instruction with general communication. Note that news_or_send is associated with the send instruction and news_or_get is associated with the get instruction. In a step 1614, the function terminates.

If, on the other hand of the source parallel value and destination parallel value are of equivalent shapes, then in a step 1616 the news_or_send or news_or_get function determines whether there are more left indices to process. If not, then in a step 1618, the function terminates.

Otherwise, in a step 1622 the minimal set determiner 1214 decomposes the offset of the next left index so as to generate a minimal set. The offset elements of the minimal set are the offsets for the least number of grid communication steps necessary to effect the grid communication. The operation of the minimal set determiner 1214 is explained in greater detail in FIGS. 14A, 14B, 15A and 15B and the accompanying text.

In a step 1624, the number of offset elements in the minimal set is compared to the threshold. If the number of offset elements exceeds the threshold, then C* compiler 154 flow of control goes to the step 1612, which is explained above.

As with the step 1326, the step 1624 could be bypassed if the hardware environment had a high threshold. If the step 1624 were bypassed or if the number of offset elements did not exceed the threshold, then in a step 1626, for each offset element in the minimal set, the news_or_send or news_or_get function invokes the Paris instruction set 164 to carry out grid communication. The step 1626 is explained in greater detail in FIG. 17 and the accompanying text. C* compiler 154 flow of control then returns to the step 1616, which is explained above.

8. Generation of Paris Calls for Minimal Set

Figure 17:
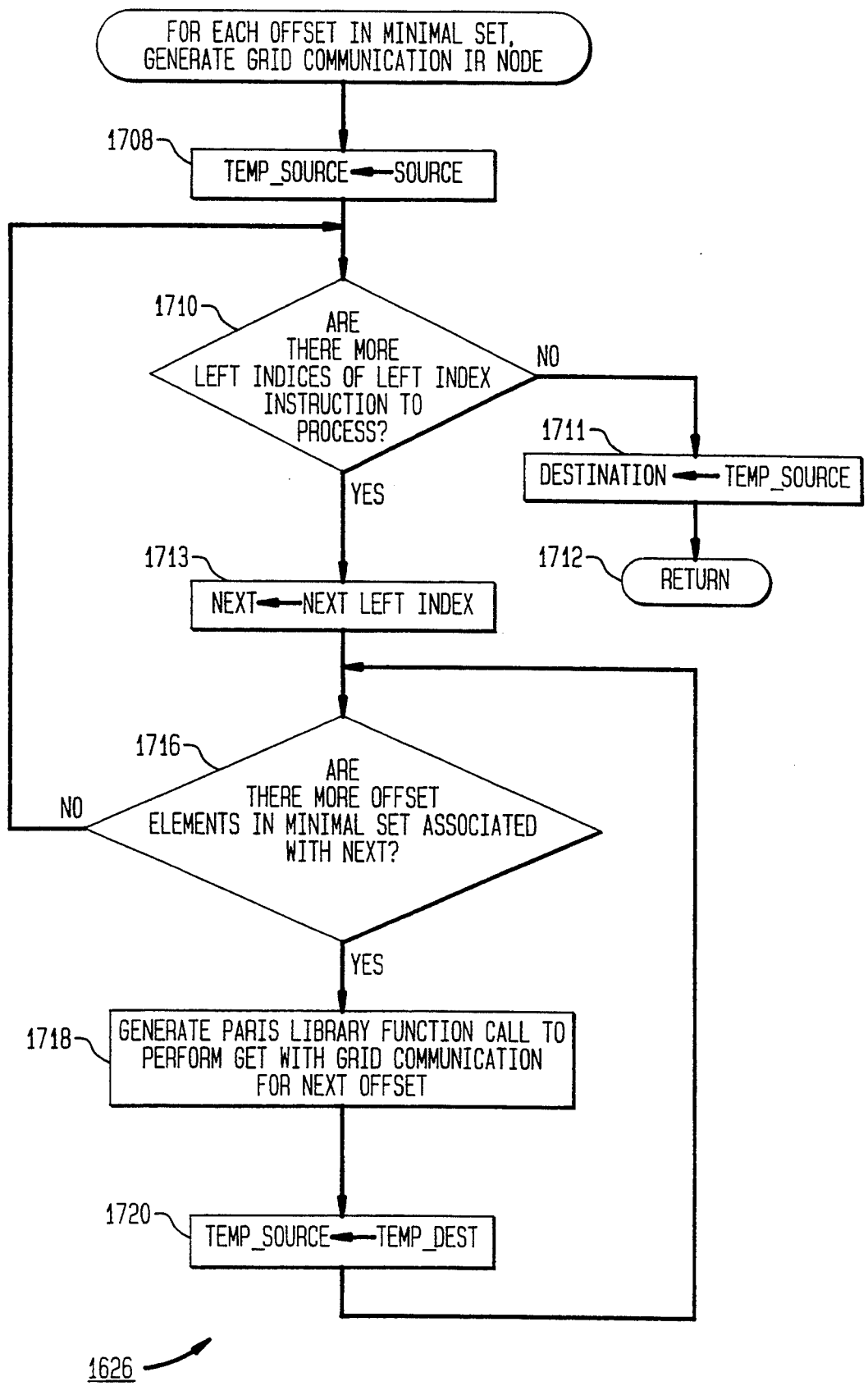
FIG. 17 shows a more detailed flow chart of a step 1336 of FIG. 13A or a step 1626 of FIG. 16 of performing grid communication for each offset in a minimal set.

FIG. 17 is a flow chart of the method of generating calls to the appropriate functions of the Paris library 162 to carry out grid communication with the offsets specified by the minimal set. Accordingly, the flow chart of FIG. 17 illustrates the detailed method of the step 1336 of FIG. 13B. The flow chart also describes the operation of the grid send IR node generator 1216 and the grid get IR node generator 1218. Note that method of the flow chart of FIG. 17 is similar to the detailed method of the step 1626 of FIG. 16, except that the latter is performed at run time rather than at compile time.

Looking at FIG. 17, in a step 1708 a temporary variable called temp_source is set to the source parallel value of the parallel communication instruction. Next, in a step 1710 the left index expression is analyzed to determine whether there are more left indices to process. If not, the parallel communication instruction has been completely carried out. Accordingly, in a step 1711, the destination is set to temp_source. Next, in a step 1712, C* compiler 154 flow of control returns to the calling function (either the step 1336 or the step 1726).

Otherwise, in a step 1713 one of the left indices which has not been processed is selected as the current left index. Next, in a step 1714 a temporary variable called temp_source is set to the source parallel value of the parallel communication instruction. In a step 1716, it is determined whether any offset elements of the minimal set associated with the current left index have not yet been processed. If not, the parallel communication instruction has been completely carried out for the current left index. Accordingly, C* compiler 154 flow of control goes to the step 1710, which is explained above.

Otherwise, in a step 1718 a send (if the parallel communication instruction is a send instruction) or a get (if the parallel communication instruction is a get instruction) is carried out from the temp_source parallel value to a temporary variable called temp_destination with the next offset in the minimal set. The Paris instruction set 164 would be invoked to carry out the grid send or grid get. In a step 1720, temp_source is set to the value of temp_destination. C* compiler 154 flow of control then returns to the step 1716 (explained above) to carry out grid communication as indicated by the remaining offsets in the minimal set.

9. C/Paris Code Generation a. Overview

Once the IR tree 332 has been optimized by the IR tree optimizer 313 (as indicated by the steps 414 and 415 of FIG. 4), then the back end 414 generates C/Paris code from the IR tree 332 (as indicated by the step 416 of FIG. 4). C/Paris code comprises standard C statements and calls to functions of the C*/Library 160 and the Paris Library 162. In general, the back end 414 generates one C/Paris statement for each IR node of the IR tree 332.

b. Examples

The C/Paris code for the first example 810 is as follows.

From the twelfth IR node, the back end 414 generates the C/Paris statement:

```
CMC_s_temp_0=32<<1;
```

This C statement specifies left-shifting a binary representation of 32 by 1 bit and assigning the result to the temporary variable CMC_s_temp_0.

From the thirteenth IR node, the back end 414 generates the C statement:

CMC_s_temp_1=CM_add_offset_to_field_id
    (destinationp, CMC_s_temp_0);

The Paris function "CM_add_offset_to_field_id" offsets its first parameter (destinationp) by the amount indicated by its second parameter (CMC_s_temp_0). The offset pointer returned by the function is assigned to the temporary variable CMC_s_temp_1. The function, as well as the other functions of the Paris library 162, are described in more detail in the above-cited *Paris Reference Manual* for Version 6.0 of Paris.

From the fourteenth IR node, the back end 314 generates the C/Paris statement:

CMC_s_temp_0=1+i;

This statement specifies adding 1 and i and assigning the sum to the temporary variable "CMC_s_temp_0".

From the fifteenth IR node, the HLL code generator 604 generates the C/Paris statement:

CM_s_multiply_3_1L (CMC_p_temp_5, source1, source2, 32); The Paris function "CM_s_multiply_3_1L" computes the product of the parallel values specified by the second and third parameters and assigns the result to the first parameter. The fourth parameter specifies the length of the elements of the second and third parameters.

Finally, the back end 314 translates the sixteenth IR node to the C/Paris statement:

CMC_from_torus_dim(CMC_s_temp_1,
    CMC_p_temp_1, 0, CMC_s_temp_0, 32);

The first four parameters of the function correspond to the operands of the seventeenth IR node. The fifth parameter is the length of the elements of the source parallel variable. These elements are 32 bit integers. The function CMC_from_torus_dim is the "from_torus" function described above. The function is in the C* library 160.

C/Paris code generation for the send instruction is similar to that for the above-described get instruction. For example, C/Paris code generated for the example send instruction

[.+(1+i)]*(destinationp+2)=source1 * source2;

is as follows:

```
CMC_s_temp_0 = 32 << 1;
CMC_s_temp_1 = CM_add_offset_to_field_id (destinationp,
        CMC_s_temp_0);
CMC_s_temp_0 = 1 + i;
CM_s_multiply_3_1L (CMC_p_temp_5, source1, source2, 32);
CMC_news_or_send(CMC_s_temp_1, CMC_p_temp_5, 32, 1,
        CMC_s_temp_0, 0, 0);
```

Four parallel communication examples further illustrate C/Paris code generation and efficient parallel communication. C* source code for the four examples follows.

```
shape [100][200][300]5;
f( )
{
    int:s i, j;
    int:physical k;
    int a;
```

```
    with(s) {
    /* EXAMPLE 1: generates instructions for get via grid
    communication because this is a get instruction, offsets are
    constant, and shape of source and destination parallel
    values is same. */
    i = [.+7][.+1][.+13]j;
    /* EXAMPLE 2: generates a call to a function to perform
    general or grid send at run time, whichever is determined
    at run time to be more efficient. Determination is made at
    run time because this is a send instruction. */
    [.+7][.+1][.+13]i = j;
    /* EXAMPLE 3: for the 0 axis, generates a call to a
    function to perform general or grid get at run time,
    whichever is determined at run time to be more efficient.
    Determination is made at run time because offset of 0 axis
    is not constant. For the 1 and 2 axis, generates instructions
    for get via grid communication because this is a get
    instruction, offsets are constant, and shape of source and
    destination parallel values is same. */
    i = [.+a][.+1][.+13]j;
    /* EXAMPLE 4: generates instructions for get via general
    communication because the shapes of source and
    destination parallel values are different */
    [.+7][.+1][.+13]j = k;
    }
}
```

From the above C* source code, the C* compiler 154 generates the following C/Paris code for the initialization and allocation necessary for the four parallel communication instructions.

```
#include <_CMC_types.h>
#include <_CMC_defs.h>
static char CMC_version[ ] = "C* Version 6.0.2 (60) for sun4";
CMC_Shape_t s = CMC_no_vp_set;
int f( );
int f( )
{
    CMC_Shape_t CMC_entry_shape =
      ((CMC_call_start_trap &&
      CMC_start_trap( )),CM_current_up_set);
    CMC_Pvar_t i = CM_allocate_stack_field_vp_set(64, s);
    CMC_Pvar_t j = CM_add_offset_to_field_id(i, 32);
    CMC_Pvar_t k =
      CM_allocate_stack_field_vp_set(32, physical);
    int a;
    CM_set_vp_set(s);
    {
        CMC_Pvar_t CMC_p_temp_11 =
          CM_allocate_stack_field_vp_set(32,
          CM_current_vp_set;
    }
}
``` i. C/Paris Code for Example 1

C/Paris code output of the C* Compiler for axis 0 of Example 1 comprises the following two calls to functions of the Paris library 162. The back end 314 generates time calls from the IR nodes generated by the grid get IR node generator 1218 of FIG. 12 in carrying out the step 1718 of FIG. 17. (Note that although all of the C code corresponding to a generated for processing each particular axis is shown together, the actual C* compiler 154 may generate the lines of C/Paris code in a different order.)

```
CM_get_from_power_two_always_1L(CMC_p_temp_11, j,
0, 3, 0, 32);
CM_get_from_news_always_1L(CMC_p_temp_11,
CMC_p.temp_11, 0, 1, 32);
```

The first function called above, CM_get_from_power_two_always_1L, is a form of the get_from_power_two function described above. At run time, the first function instructs each destination parallel processor 112 to retrieve the element of a source parallel variable on a source parallel processor 112 separated from the destination parallel processor 112 by a specified power-of-two distance and a specified direction along a specified axis. Each destination parallel processor 112 places the retrieved value in the position of a destination parallel variable which is stored on it. The first argument to the first function (CMC_p_temp_11) is the destination parallel variable. The second argument (j) is the source parallel variable. The third argument of the function specifies the axis (0) along which the shifting is to be performed. The fourth argument (3) is log₂ (distance from each destination position to the corresponding source position). The fifth argument (0) indicates that the direction from each source position to the corresponding destination position is upward. The sixth argument (32) specifies the length of the source and destination parallel variables. At run time, the function performs a get operation via grid communication from j to a compiler-generated temporary variable called CMC_p_temp_11 with an offset of 8. (A positive offset indicates the upward direction and a negative offset indicates the downward direction.)

Note that the source parallel value of an initial grid communication instruction is the source parallel variable of the associated parallel communication instruction. The destination parallel value of a final grid communication step is the destination parallel variable of the associated parallel communication instruction. Otherwise, a compiler-generated temporary parallel variable is the source and/or destination parallel value.

The second function called above, CM_get_from_news_1L_always, is a form of the get_from_news function described above. The function performs a get in the same manner as CM_get_from_power_two_always_1L, except the offset must be 1 or −1. The fields of the first, second and third arguments of CM_get_from_news_always_1L are the same as those for the first, second and third arguments of CM_get_from_power_two_always_1L. Because the second function is neither an initial nor a final grid communication step, CMC_p_temp_11 is both the source and destination of CM_get_from_news_always_1L. The axis is again 0. There is no field for the distance, as it must be 1. The fourth argument (0) indicates that the direction is downward. The fifth argument is the same as the sixth argument of CM_get_from_power_two_always_1L. At run time, the second function performs a get operation via grid communication from CMC_p_temp_11 to CMC_p_temp_11 with an offset of −1.

Note that both of the above-functions are "always" forms of the associated Paris functions, as indicated the suffix "always". The purpose of the always form relates to contextualization. If a send instruction is contextualized, then only elements from a specified subset of the source positions are sent. If a get instruction is contextualized, then values are only retrieved to a specified subset of the destination positions. The positions included in the subset are referred to as "active". Contextualization is explained in greater detail in the above-cited document entitled *Programming in C\**.

When a send instruction is decomposed into a number of grid communication steps, only the initial step should be contextualized. Similarly, when a get instruction is decomposed into a number of grid communication steps, only the final step should be contextualized. Accordingly, contextualization is temporarily disregarded by using always forms of the Paris parallel communication functions. Neither the first nor the second function called above carries out the final assignment of the associated get operation. Therefore, the always forms are used. Determination of whether an always form of a Paris function can be used is described in detail in the above-cited pending U.S. patent application Ser. No. 07/788,003,filed Nov. 5, 1991, entitled *System and Method for Shape Selection and Contextualization*, now abandoned, in favor of application Ser. No. 08/126,132, filed Sep. 24, 1993.

C/Paris code output of the C* compiler 154 for axis 1 of Example 1 follows.

CM_get_from_news_always_1L(CMC_p_temp_11, CMC_p_temp_11, 1, 0, 32);

At run time, the function instructs the parallel processors 112 to perform a get via grid communication from the source parallel variable CMC_p_temp_11 to the destination parallel variable CMC_p_temp_11 along axis 1 with an offset of 1.

C/Paris code output of the C* Compiler for axis 2 of Example 1 follows.

CM_get_from_power_two_always_1L(CMC_p_temp_11, CMC_p_temp_11, 2, 3, 0, 32);
CM_get-from_power_two_always_1L(CMC_p_temp_11, CMC_p_temp_11, 2, 2, 0, 32);
CM_get_from_news_1L(i, CMC_p_temp_11, 2, 0, 32);

At run time, the first function called above instructs the parallel processors 112 to perform a get via grid communication from the source parallel variable CMC_p_temp_11 to the destination parallel variable CMC_p_temp_11 along axis 2 with an offset of 8. The second function called above instructs the parallel processors 112 to perform a get via grid communication from CMC_p_temp_11 to CMC_p_temp_11 along axis 2 with an offset of 4. The third function called above instructs the parallel processors 112 to perform a get via grid communication from CMC_p_temp_11 to i along axis 2 with an offset of 1. The third function called above is the final grid communication step of the get instruction. It is therefore contextualized, as indicted by the lack of the "always" suffix.

ii. C/Paris Code for Example 2

The grid send IR node generator 1216 generates the following C/Paris code output for Example 2 (see step 1336 of FIG. 13).

CMC_to_torus(i, j, 32, 7, 1, 13);

CMC_to_torus (described above) is a function found in the C* library 160 of FIG. 1. At run time, the function instructs each source parallel processor 112 to send the element in the position of a source parallel variable on the source parallel processor 112 to the position of a destination parallel variable on a destination parallel processor 112 which is separated from the source parallel processor 112 by a specified offset and a specified axis. The source parallel processors 112 are those parallel processors 112 on which the position of the source parallel variable is active. The first argument to the function (i) is the destination parallel variable. The second argument to the function (j) is the source parallel variable. The third argument to the function (32) specifies the length of the source and destination parallel variables. The fourth argument to the function (7) specifies the offset of the 0 axis. The fifth argument (1) specifies the offset of the 1 axis. The sixth argument (13) specifies the offset of the 2 axis. Note that the offsets have not been decomposed into powers of two. At run time, CMC_to_torus will cause the host computer 146 to perform the decomposition and invoke the Paris instruction set 164 to instruct the parallel processors 112 to carry out the send instruction with grid communication.

iii. C/Paris code for Example 3

The grid get IR node generator 1218 generates the following C/Paris code for axis 0 of Example 3.

```
CMC_from_torus_dim_always
   (CMC_p_temp_11, CMC_p_temp_11, j, 0, a,
   32);
```

At run time, the above function instructs the host computer 146 to decompose the value of "a" into a minimal set and invokes the Paris instruction set 164 to instruct the parallel processors 112 to perform a get via grid communication from j to CMC_p_temp_11 with a shift along the 0 axis by the offset specified by the value of "a". Note that the C* compiler 154 of FIG. 1 which generated the above function call was configured to bypass the step 1326 of FIG. 13A. Otherwise, the C* compiler 154 could not have determined (in step 1334 of FIG. 13B) whether the number of offset elements of the associated minimal set exceeded the threshold.

C/Paris code output of the C* compiler 154 for axis 1 of Example 3 follows.

```
CM_get_from_news_always_1L(CMC_p_tem-
   p_11, CMC_p_temp_11, 1, 0, 32);
```

At run time, the above function performs a get via grid communication from the source parallel variable CMC_p_temp_11 to the destination parallel variable CMC_p_temp_11 along axis 1 with an offset of 1.

C/Paris code output of the C* compiler 154 for axis 2 of Example 3 follows.

```
CM_get_from_power_two_always_1L(CMC_p_temp_11,
CMC_p_temp_11, 2, 2, 0, 32);
CM_get_from_power_two_always_1L(CMC_p_temp_11,
CMC_p_temp_11, 2, 3, 0, 32);
CM_get_from_news_1L(i, CMC_p_temp_11, 2, 0, 32);
```

At run time, the first of the above functions causes to be performed a get via grid communication from the source parallel variable CMC_p_temp_11 to the destination parallel variable CMC_p_temp_11 along axis 2 with an offset of four. The second of the above functions causes to be performed a get via grid communication from the source parallel variable CMC_p_temp_11 to the destination parallel variable CMC__p_temp_11 along axis 2 with an offset of 8. The third of the above functions causes to be performed a get via grid communication from the source parallel variable CMC_p_temp_11 to the destination parallel variable i along axis 2 with an offset of 1. Because the third function is the final grid communication step of the get instruction, it is contextualized, as indicated by the lack of the "always" suffix.

iv. C/Paris code for Example 4

The grid send IR node generator 1216 generates the following C/Paris code for Example 4 (see step 1324 of FIG. 13B).

```
CMC_news_or_send(k, j, 32, 7, 1, 13);
```

CMC_news_or_send is a function found in the C* library 160 of FIG. 1. At run time, the function instructs the host computer 146 to determine whether grid communication would possible and be more efficient than general communication. If the determination is positive, then the parallel processors 112 are instructed to carry out the a send instruction with grid communication. Otherwise, the parallel processors 112 are instructed to carry out the send instruction with general communication. The first argument to the function (k) is the destination parallel variable. The second argument (j) is the source parallel variable. The third argument (32) is the size of the source and destination parallel variables. The fourth argument (7) is the offset of the 0 axis. The fifth argument (1) is the offset of the 1 axis. The sixth argument (13) is the offset of the 2 axis.

10. Execution of Parallel Communication Instructions a. Send Instruction

Figure 18:
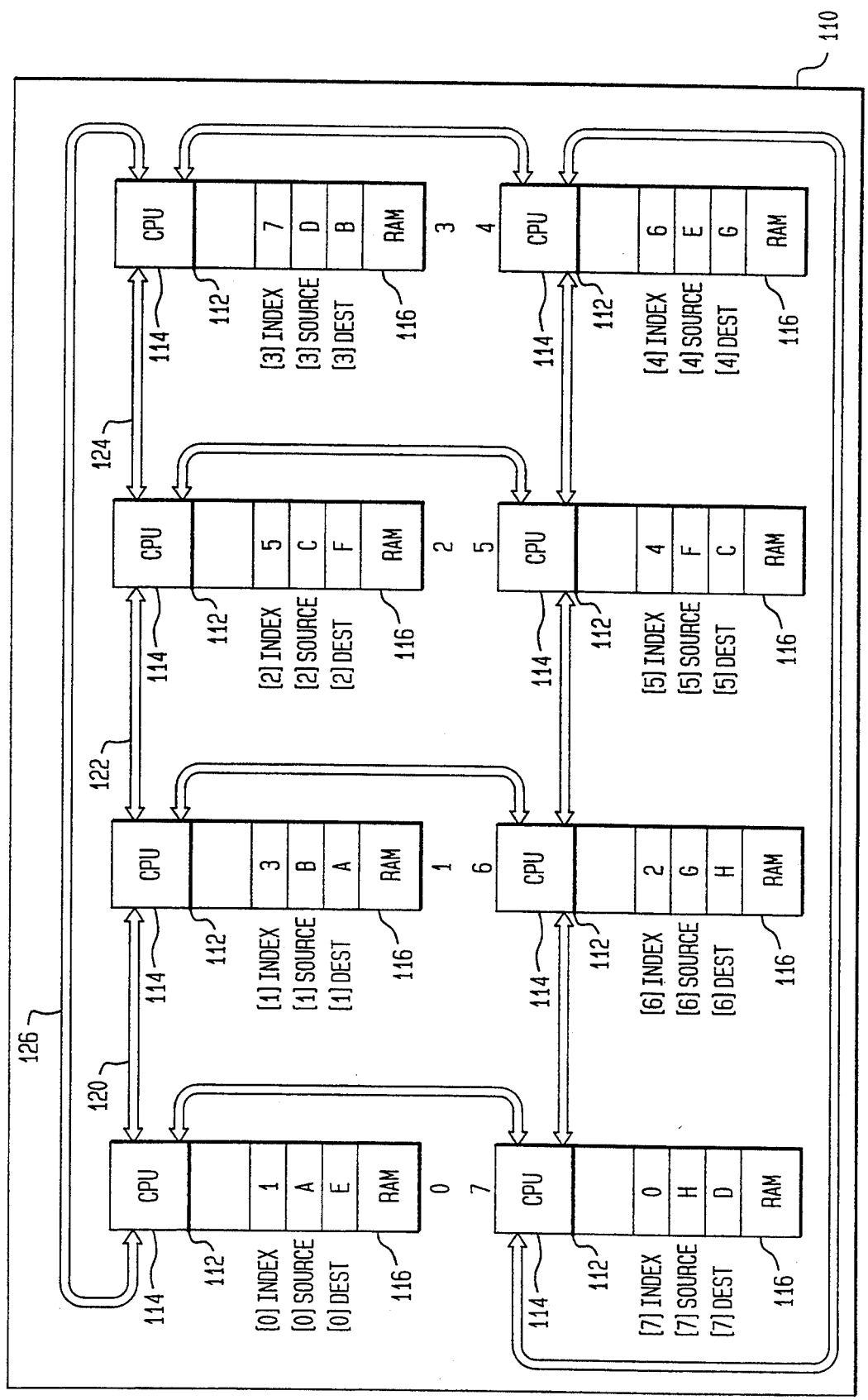
FIG. 18 shows the execution of a send instruction on a data parallel computer of FIG. 1.

FIG. 18 shows how an example send instruction would be executed on the data parallel computer 110. C* source code for the example is:

```
shape [8]S;
char:S dest, source;
int:S index,
main {
   with(S)
      [index]dest = source;
}
```

Looking at FIG. 18, initial values of the elements of index are assumed to be as follows: [0]index is 1, [1]index is 3, [2]index is 5,[3]index is 7, [4]index is 6, [5]index is 4, [6]index is 2, and [7]index is 0. Initial values of the elements of source are assumed to be as follows: [0]source is A, [1]source is B, [2]source is C, [3]source is D, [4]source is E, [5]source is F, [6]source is G, and [7]source is H.

The left index expression "[index]" is a parallel variable. It is not of the form

```
[(./pcoord
   (left_index_identifier){±scalar_int_expression
   }){%% dimof(current_shape,
   left_index_identifier)}]
```

Accordingly, the left index expression does not unambiguously indicate that grid communication is possible. Therefore, the send instruction "[index]dest=source" would be carried out by general communication.

Specifically, the send instruction would be carried out as follows. The parallel processor$_0$ 112 sends a copy of the A in [0]source to the position [1]dest of the parallel processor$_1$ 112. The parallel processor$_1$ 112 sends a copy of the B in [1]source to the position [3]dest of the parallel processor$_3$ 112. The parallel processor$_2$ 112 sends a copy of the C in [2]source to the position [5]dest of the parallel processor$_5$ 112. The parallel processor$_3$ 112 sends a copy of the D in [3]source to the position

[7]dest of the parallel processor$_7$ 112. The parallel processor$_4$ 112 sends a copy of the E in [4]source to the position [6]dest of the parallel processor$_6$ 112. The parallel processor$_5$ 112 sends a copy of the F in [5]source to the position [4]dest of the parallel processor$_4$ 112. The parallel processor$_6$ 112 sends a copy of the G in [6]source to the position [2]dest of the parallel processor$_6$ 112. The parallel processor$_7$ 112 sends a copy of the H in [7]source to the position [0]dest of the parallel processor$_0$ 112.

b. Get Instruction

FIG. 18 shows how an example get instruction would be executed on the data parallel computer 110. C* source code for the example is:

```
shape [8]S;
char:S dest, source;
main {
    with(S)
        dest = [(.+3) %% 8]source;
}
```

Figure 19:
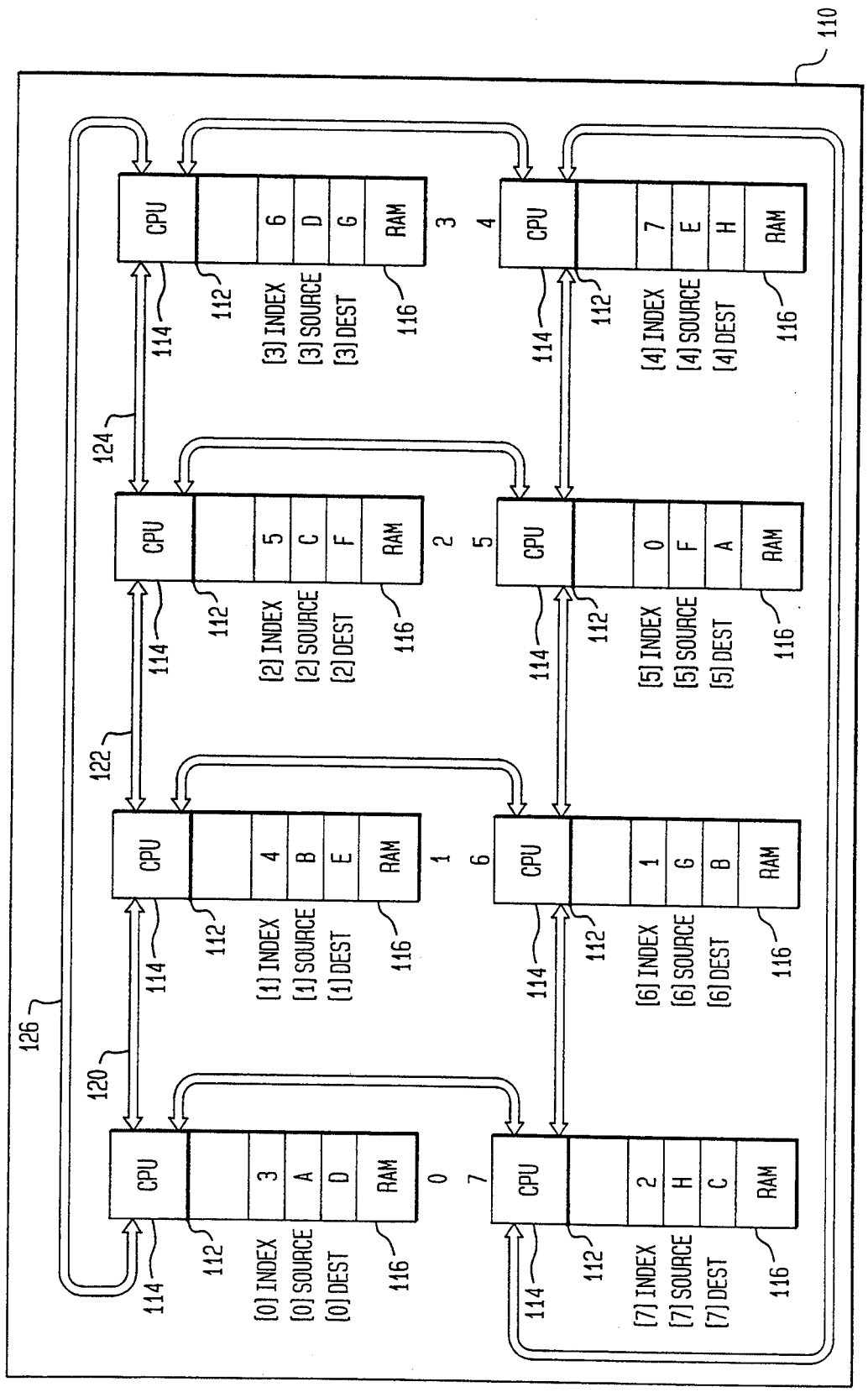
FIG. 19 shows the execution of a get instruction on the data parallel computer of FIG. 1.

Looking at FIG. 19, initial values of the elements of source are assumed to be as follows: [0]source is A, [1]source is B, [2]source is C, [3]source is D, [4]source is H, [5]source is G, [6]source is F, and [7]source is E. It is assumed that the parallel value calculated for the left index of the get instruction is stored in a compiler-generated temporary variable called temp. Looking at FIG. 19, the elements of temp are as follows: [0]temp is 3, [1]temp is 4, [2]temp is 5, [3]temp is 6, [4]temp is 7, [5]temp is 0, [6]temp is 1, and [7]temp is 2.

The left index expression of the get instruction, "[(.+3)%% 8]" is of the form

[(./pcoord(left_index_identifier){±scalar_int_expression}){%% dimof(current_shape, left_index_identifier)}]

Accordingly, the get instruction "dest=[(.+3)%% 8]source" would be carried out with grid communication.

Specifically, each position [i]dest on the parallel processor$_i$ 112 would retrieve a copy of the element of [(i+3) modulo 8]source on the parallel processor$_{[(i+3) modulo 8]}$ 112. Accordingly, after execution, the values of dest are as follows: [0]dest is D, [1]dest is E, [2]dest is F, [3]dest is G, [4]dest is H, [5]dest is A, [6]dest is B and [7]dest is C.

11. Conclusion

While the invention has been particularly shown and described with reference to preferred embodiments thereof, it will be understood by those skilled in the art that various changes in form and details may be made therein without departing from the spirit and scope of the invention.

We claim:

1. A system for generating a target program from a source program, the target program being adapted for execution in a processor array having a plurality of processors interconnected by a communications network for transferring data thereamong, the source program declaring a plurality of parallel variables each defining a multi-dimensional array having a plurality of positions assigned to the processors, each of the positions representing a storage location to contain data to be processed in accordance with the target program, the source program also including a parallel communication instruction having a data identifier portion and a data transfer information portion, the data identifier portion identifying a source parallel variable and a destination parallel variable, the data transfer information portion indicating a relationship between positions of the source and destination parallel variables to facilitate the transfer of data among the processors from the positions of the source parallel variable to the positions of the destination parallel variable in accordance with the data transfer information portion, the system comprising:

A. a computer;
B. control means for controlling the computer, comprising:
   (i) destination identifier generation enabling means for enabling the computer to generate a destination location identifier target program portion which, when executed in the processor array, enables the processor array to generate, in response to the data transfer information portion, destination storage location identifiers for the positions of the destination parallel variable; and
   (ii) communication enabling means for enabling the computer to generate a communication target program portion which, when executed in the processor array, enables the processors of the processor array to transfer over the communications network data from the positions of the source parallel variable to the positions of the destination parallel variable in accordance with said destination storage location identifiers.

2. The system of claim 1, wherein said control means further comprises:
   (iii) comparison means for enabling the computer to determine regular mapping indicia indicating whether the data transfer information portion indicates a uniform mapping of the data from the source positions to corresponding ones of the destination positions; and
   (iv) optimizing means for enabling the computer to optimize the target program in response to the regular mapping indicia.

3. The system of claim 2, wherein said optimizing means comprises:
   minimal set generating means for enabling the computer to generate a minimal set program portion which, when executed in the processor array, enables the processor array to calculate a minimal set of communications network offsets between the source positions and corresponding ones of the destination positions;
   means for enabling the computer to generate an offset communication program portion which, when executed in the processor array, enables the processor array to transfer the data over the communications network from the source positions to the corresponding destination positions in accordance with the communications network offsets; and
   means for enabling the computer to establish the minimal set program portion and the offset communication program portion in the target program.

4. The system of claim 3, wherein said minimal set generating means comprises means for enabling the computer to generate said communications network offsets such that each of said communications network offsets is a power of two, a combination of said communications network offsets corresponding to a constant offset which maps said source positions to said destination positions.

5. The system of claim 2 in which the source program also includes instructions to define shapes, each of said shapes being a template for declaring parallel variables, wherein said comparison means also comprises means for enabling the computer to determine a correspondence between a shape of the source parallel variable and a shape of the destination parallel variable.

6. The system of claim 1 in which said data transfer information portion comprises a routing pattern parallel variable defining a multi-dimensional index array having a configuration comprising a plurality of positions each representing a storage location to contain data indicating a mapping between the source positions and the destination positions, wherein said destination identifier generation enabling means enables the computer to generate said destination location identifier target program portion in accordance with said routing pattern parallel variable.

7. The system of claim 6 in which each of said positions of said routing pattern parallel variable contains data identifying one of said destination positions of said destination parallel variable, wherein said communication enabling means enables the computer to generate said communication target program portion which, when executed in the processor array, enables the processors of the processor array to transfer over the communications network data from a particular position of said source parallel variable to a position of said destination parallel variable identified by data contained in a position of said routing pattern parallel variable corresponding to said particular position of said source parallel variable.

8. The system of claim 6 in which each of said positions of said routing pattern parallel variable contains data identifying one of said source positions of said source parallel variable, wherein said communication enabling means enables the computer to generate said communication target program portion which, when executed in the processor array, enables the processors of the processor array to transfer over the communications network data to a particular position of said destination parallel variable from a position of said source parallel variable identified by data contained in a position of said routing pattern parallel variable corresponding to said particular position of said destination parallel variable.

9. The system of claim 1 in which the source program also includes a pcoord instruction which, when executed in the processor array, enables the processor array to create routing pattern parallel variable defining a multi-dimensional array having a configuration comprising a plurality of positions each representing a storage location to contain data to be processed in accordance with the target program, said pcoord instruction associated with a pcoord argument which identifies an axis of said routing pattern parallel variable, said pcoord instruction when executed also enabling the processor array to initialize values of said positions of said routing pattern parallel variable to respective coordinate values of said axis identified by said pcoord argument, wherein said destination identifier generation enabling means enables said computer to generate said destination location identifier target program portion in accordance with said pcoord instruction when said pcoord instruction forms a part of said data transfer information portion.

10. The system of claim 2 in which said processors of said processor array are configured in a grid wherein said parallel communication instruction identifies paths in said grid over which data is transferred during execution of said parallel communication instruction in said processor array, wherein said comparison means also comprises means for enabling said computer to determine whether the length of said paths is excessive.

11. A control arrangement for controlling a computer to generate a target program from a source program, the target program being adapted for execution in a processor array having a plurality of processors interconnected by a communications network for transferring data thereamong, the source program declaring a plurality of parallel variables each defining a multi-dimensional array having a plurality of positions assigned to the processors, each of the positions representing a storage location to contain data to be processed in accordance with the target program, the source program also including a parallel communication instruction having a data identifier portion and a data transfer information portion, the data identifier portion identifying a source parallel variable and a destination parallel variable, the data transfer information portion indicating a relationship between positions of the source and destination parallel variables to facilitate the transfer of data among the processors from the positions of the source parallel variable to the positions of the destination parallel variable in accordance with the data transfer information portion, the control arrangement comprising:

A. destination identifier generation enabling means for enabling the computer to generate a destination location identifier target program portion which, when executed in the processor array, enables the processor array to generate, in response to the data transfer information portion, destination storage location identifiers for the positions of the destination parallel variable;

B. communication enabling means for enabling the computer to generate a communication target program portion .which, when executed in the processor array, enables the processor array to transfer over the communications network data from the positions of the source parallel variable to the positions of the destination parallel variable in accordance with said destination storage location identifiers.

12. The control arrangement of claim 11, further comprising:

C. comparison means for enabling the computer to determine regular mapping indicia indicating whether the data transfer information portion indicates a uniform mapping of the data from the source positions to corresponding ones of the destination positions; and D. optimizing means for enabling the computer to optimize the target program in response to the regular mapping indicia.

13. A computer implemented method of generating a target program from a source program, the target program being adapted for execution in a processor array having a plurality of processors interconnected by a communications network for transferring data thereamong, the source program declaring a plurality of parallel variables each defining a multi-dimensional array having a plurality of positions assigned to the processors, each of the positions representing a storage location to contain data to be processed in accordance with the target program, the source program also including a parallel communication instruction having a data identifier portion and a data transfer information portion, the data identifier portion identifying a source parallel variable and a destination parallel variable, the data transfer information portion indicating a relationship between positions of the source and destination parallel variables to facilitate the transfer of data among the processors from the positions of the source parallel variable to the positions of the destination parallel variable in accordance with the data transfer information portion, the method comprising the steps of:

(a) generating a destination location identifier target program portion for enabling the processor array to generate, in response to the data transfer information portion, destination storage location identifiers for the positions of the destination parallel variable; and (b) generating a communication target program portion for enabling the processors of the processor array to transfer over the communications network data from the positions of the source parallel variable to the positions of the destination parallel variable in accordance with said destination storage location identifiers.

14. The method of claim 13, further comprising:

(c) determining regular mapping indicia indicating whether the data transfer information portion indicates a uniform mapping of the data from the source positions to corresponding ones of the destination positions;

(d) optimizing the target program in response to the regular mapping indicia.

15. The method of claim 14, wherein step (d) comprises the steps of:

generating a minimal set program portion to enable the processor array to calculate a minimal set of communications network offsets between the source positions and corresponding ones of the destination positions;

generating an offset communication program portion to enable the processor array to transfer the data over the communications network from the source positions to the corresponding destination positions in accordance with the communications network offsets; and establishing the minimal set program portion and the offset communication program portion in the target program.

16. A system for generating a target program from a source program, the target program being adapted for execution in a processor array having a plurality of processors interconnected by a communications network for transferring data thereamong, the source program declaring a plurality of parallel variables each defining a multi-dimensional array having a plurality of positions assigned to the processors, each of the positions representing a storage location to contain data to be processed in accordance with the target program, the source program also including a parallel communication instruction having a data identifier portion and a data transfer information portion, the data identifier portion identifying a source parallel variable and a destination parallel variable, the data transfer information portion indicating a relationship between positions of the source and destination parallel variables to facilitate the transfer of data among the processors from the positions of the source parallel variable to the positions of the destination parallel variable in accordance with the data transfer information portion, the system comprising:

a destination identifier generation enabling portion for generating a destination location identifier target program portion which, when executed in the processor array, enables the processor array to generate, in response to the data transfer information portion, destination storage location identifiers for the positions of the destination parallel variable; and a communication enabling portion for generating a communication target program portion which, when executed in the processor array, enables the processors of the processor array to transfer over the communications network data from the positions of the source parallel variable to the positions of the destination parallel variable in accordance with said destination storage location identifiers.

* * * * *